US008626376B2

(12) United States Patent
Trottier et al.

(10) Patent No.: US 8,626,376 B2
(45) Date of Patent: Jan. 7, 2014

(54) METHOD, SYSTEM AND MEDIA FOR WIRELESS PROCESS CONTROL OF MOBILE EQUIPMENT

(75) Inventors: Derrick Trottier, Fort McMurray (CA); Jamie Haggett, Edmonton (CA)

(73) Assignee: Suncor Energy Inc., Calgary, AB (CA)

( * ) Notice: Subject to any disclaimer, the term of this patent is extended or adjusted under 35 U.S.C. 154(b) by 670 days.

(21) Appl. No.: 12/864,350

(22) PCT Filed: Jan. 24, 2008

(86) PCT No.: PCT/CA2008/000159
§ 371 (c)(1),
(2), (4) Date: Nov. 12, 2010

(87) PCT Pub. No.: WO2009/092149
PCT Pub. Date: Jul. 30, 2009

(65) Prior Publication Data
US 2011/0053624 A1 Mar. 3, 2011

(51) Int. Cl.
*G06F 11/30* (2006.01)
(52) U.S. Cl.
USPC ....... 701/29.3; 701/29.1; 701/29.2; 701/31.4; 701/31.5; 701/34.2
(58) Field of Classification Search
USPC .................. 701/29.1–29.3, 31.4, 31.5, 34.2
See application file for complete search history.

(56) References Cited

U.S. PATENT DOCUMENTS

| | | | | |
|---|---|---|---|---|
| 5,805,442 A | * | 9/1998 | Crater et al. | 700/9 |
| 5,845,230 A | * | 12/1998 | Lamberson | 702/56 |
| 6,226,572 B1 | * | 5/2001 | Tojima et al. | 701/23 |
| 6,510,350 B1 | | 1/2003 | Steen et al. | |
| 7,062,540 B2 | * | 6/2006 | Reddy et al. | 709/217 |
| 7,096,092 B1 | * | 8/2006 | Ramakrishnan et al. | 700/281 |
| 7,111,205 B1 | * | 9/2006 | Jahn et al. | 714/47.2 |
| 7,193,512 B1 | * | 3/2007 | Coulthard | 340/531 |
| 7,200,397 B1 | * | 4/2007 | Jones et al. | 455/436 |
| 7,634,343 B2 | * | 12/2009 | Makela | 701/50 |
| 7,853,402 B2 | * | 12/2010 | Makela et al. | 701/517 |
| 2003/0214961 A1 | * | 11/2003 | Nevo et al. | 370/401 |
| 2006/0079278 A1 | | 4/2006 | Ferguson et al. | |
| 2006/0080442 A1 | | 4/2006 | Ferguson et al. | |
| 2006/0146825 A1 | * | 7/2006 | Hofstaedter et al. | 370/392 |
| 2006/0208892 A1 | | 9/2006 | Ehrman et al. | |
| 2007/0135137 A1 | | 6/2007 | Olson | |

FOREIGN PATENT DOCUMENTS

WO WO 2006/042911 A1 4/2006

OTHER PUBLICATIONS

International Search Report dated Oct. 1, 2008, for International Application No. PCT/CA2008/000159.
Written Opinion dated Oct. 1, 2008, for International Application No. PCT/CA2008/000159.

* cited by examiner

*Primary Examiner* — Thomas Black
*Assistant Examiner* — Donald J Wallace
(74) *Attorney, Agent, or Firm* — Knobbe, Martens, Olson & Bear, LLP

(57) ABSTRACT

A system for wireless process control comprises at least a first wireless network, which is used to communicate real-time instructions and data between one or more pieces of mobile equipment to at least one other piece of mobile equipment. In one variant, a second wireless network is provided, using a different radio frequency band, to concurrently communicate the same or substantially the same real-time instructions and data as are communicated over the first wireless network.

38 Claims, 9 Drawing Sheets

METHOD, SYSTEM AND MEDIA FOR WIRELESS PROCESS CONTROL OF MOBILE EQUIPMENT

This application is U.S. National Phase of International Application PCT/CA2008/000159, filed Jan. 24, 2008, designating the U.S., and published in English as WO 2009/092149 on Jul. 30, 2009.

FIELD OF THE INVENTION

The present invention relates generally to a method, system and media for wireless process control of mobile equipment.

BACKGROUND OF THE INVENTION

In remote mobile mining operations, a train of mobile mining equipment comprised of one or more pieces of mobile equipment, may work together in mining and processing a mined resource material. Communication between the various large pieces of mining equipment is accomplished through a wired medium. Although wired systems can assist in the control and operation of mobile equipment, they also present many challenges. In general, wired systems are limited in their ability to support process control by the extent and availability of wired connections. In addition, with wired systems, an operator of the mobile equipment is at the mercy of the cabling required, which can reduce mobility, range of operation and range of motion of the mobile equipment. Cabling in a wired system is also susceptible to both physical and environmentally induced damage, including from inadvertent operator and equipment impacts.

In the context of large mobile mining equipment, wired systems are yet further susceptible to damage and operational and maintenance problems. For instance, large mobile mining equipment can have hundreds or thousands of I/O points, further complicating the cabling requirements. The result is that for a wired system the cabling requirements are often very substantial, with very large numbers of cables connected to the various pieces of mining equipment. In addition, when one wishes to relocate a train of mobile mining equipment, or swap out one of the pieces of mobile mining equipment, a vast array of cables forming part of the wired control system often needs to be disconnected, collected and then laid out and reconnected at the new mining operations site. Given the critical data and instructions that may need to be communicated over the wired system, reconnecting all of the cabling can lead to a tremendous amount of time spent recommissioning the mobile mining equipment to ensure that all cabling has been correctly reconnected.

There is therefore a need for a method and system of wireless control of mobile equipment that offers enhancements or alternatives to the manner in which mobile equipment, including mobile mining equipment, is controlled and operated remotely.

SUMMARY OF THE INVENTION

The present invention provides an improved method, system and media for wireless process control of mobile equipment.

In accordance with one aspect of the present invention, there is provided a system adapted to support real-time remote monitoring and control of mobile equipment. With this aspect, the system comprises a plurality of equipment data collectors and controllers, a plurality of first wireless bridges, a plurality of second wireless bridges and a host equipment control computer. Each of the plurality of equipment data collectors and controllers are positionable on a corresponding one of a plurality of mobile equipment, and are operative to collect a set of status and operational data from the corresponding one of the plurality of mobile equipment. The plurality of equipment data collectors and controllers are also operative to control at least one feature of a corresponding one of the plurality of mobile equipment. The plurality of first wireless bridges are positionable on at least one of the plurality of mobile equipment, with each of the first wireless bridges operative to communicate according to a first radio frequency band, operative to transmit the first set of status and operational data for processing, and operative to receive data and instructions for controlling at least one of the plurality of equipment data collectors and controllers. The plurality of second wireless bridges are also positionable on at least one of the plurality of mobile equipment, with each of the second wireless bridges operative to communicate according to a second radio frequency band substantially different from the first radio frequency band, operative to transmit, concurrent with the same or substantially the same data transmitted by the plurality of first wireless bridges, the first set of status and operational data, and operative to receive, concurrent with the same or substantially the same data and instructions received by any of the plurality of first wireless bridges, data and instructions for controlling at least one of the plurality of equipment data collectors and controllers. The host equipment control computer is operative to communicate with plurality of mobile equipment via at least one of the plurality of mobile equipment and operative to control at least a set of features on the plurality of mobile equipment. The host equipment control computer comprises an equipment monitoring and control program stored on a computer-readable media, with the program comprising computer-readable instructions adapted to instruct the host equipment control computer to: (a) monitor for and process status and operational data specific to each of the plurality of mobile equipment, received via both the plurality of first wireless bridges and the plurality of second wireless bridges when positioned on the mobile equipment, including control data and run status data for each of the plurality of mobile equipment; and (b) provide at least part of each set of status and operational data for display on a user interface displayed on a display device connected to at least one of the host equipment control computer and a remote computer in communication with the host equipment control computer.

In accordance with another aspect of the present invention, there is provided a system for real-time remote monitoring and control of mobile mining equipment using at least two concurrently operational wireless networks. With this aspect, the system comprises a first mobile mining process train, a first plurality of equipment data collectors and controllers and a host equipment control computer. The first mobile mining process train comprises a first plurality of mobile mining equipment including a first mobile slurry facility operative to receive and process mined material from other equipment in the first mobile mining process train. The first plurality of equipment data collectors and controllers are each positioned on a corresponding one of the first plurality of mobile mining equipment, with each of the first plurality of equipment data collectors and controllers operative to collect a set of status and operational data from the corresponding one of the first plurality of mobile mining equipment, and operative to control at least one feature of the corresponding one of the first plurality of mobile mining equipment. The first plurality of equipment data collectors and controllers are positioned in communication with first and second wireless bridges. Each first wireless bridge is positioned on a corresponding one of the first plurality of mobile mining equipment, is operative to communicate according to a first radio frequency band, is operative to transmit the first set of status and operational data for processing, and is operative to receive data and instructions for controlling the corresponding equipment data collector and controller. Each second wireless bridge is positioned on a corresponding one of the first plurality of mobile mining equipment, is operative to communicate according to a second radio frequency band substantially different from the first radio frequency band, is operative to transmit, concurrent with the same or substantially the same data transmitted by the first wireless bridge, the first set of status and operational data for further processing, and is operative to receive, concurrent with the same or substantially the same data and instructions received by the first wireless bridge, data and instructions for controlling the corresponding equipment data collector and controller. The first wireless bridges collectively form a first wireless network and the second wireless bridges collectively form a second wireless network. In addition, the data collector and controller positioned on the first mobile slurry facility is further operative to receive status and operational data concurrently over both the first wireless network and the second wireless network from each of the other data collectors and controllers positioned on the other pieces of equipment in the first mobile mining process train. In this aspect, the host equipment control computer operative to communicate with first plurality of mobile mining equipment via the first mobile slurry facility, and operative to control at least a set of features on the first mobile mining process train, with the host equipment control computer comprising an equipment monitoring and control program stored on a computer-readable media, the program comprising computer-readable instructions adapted to instruct the host equipment control computer to: (a) monitor for and process status and operational data specific to each of the pieces of equipment in the first mobile mining process train, received via both the first and second wireless bridges positioned on the first mobile slurry facility, including control data and run status data for each piece of equipment in the first mobile mining process train; and (b) provide at least part of each set of status and operational data for display on a user interface displayed on a display device connected to at least one of the host equipment control computer and a remote computer in communication with the host equipment control computer.

In accordance with another aspect, there is provided a method of monitoring and controlling a plurality of mobile mining equipment. The method comprises:
(a) establishing a first wireless network for monitoring and controlling the plurality of mobile mining equipment, including configuring a first set of wireless bridges comprising a plurality of first wireless bridges, each first wireless bridge positioned on one of the plurality of mobile mining equipment, to communicate according to a first radio frequency band;
(b) establishing a second wireless network for monitoring and controlling the plurality of mobile mining equipment concurrently with the first wireless network, including configuring a second set of wireless bridges comprising a plurality of second wireless bridges, each second wireless bridge positioned on one of the plurality of mobile mining equipment, to communicate according to a second radio frequency band substantially different from the first radio frequency band, wherein the second set of wireless bridges communicate substantially concurrently the same or substantially the same data transmitted by corresponding ones of the first set of wireless bridges;
(c) collecting a set of status and operational data from each of the plurality of mobile mining equipment via at least one equipment data collector and controller positioned on each of the plurality of mobile mining equipment so as to form collected sets of status and operational data;
(d) transmitting, over the first and second wireless networks, the collected sets of status and operational data from the first and second wireless bridges positioned on the plurality of mobile mining equipment to a host equipment control computer;
(e) processing, with the host equipment control computer, at least part of the collected sets of status and operational data received from the first and second wireless bridges via the first and second wireless networks; and
(f) providing at least part of the collected sets of status and operational data for display on a user interface of a field operator's personal computing device operative to remotely monitor and control at least a portion of the features of the plurality of mobile mining equipment.

In accordance with another aspect of the present invention, there is provided a computer-readable medium having stored instructions for use in the execution of the foregoing method.

The foregoing and other aspects of the invention will become more apparent from the following description of specific embodiments thereof and the accompanying drawings which illustrate, by way of example only, the principles of the invention.

BRIEF DESCRIPTION OF THE DRAWINGS

In the accompanying drawings which illustrate embodiments of the invention.

DETAILED DESCRIPTION

Figure 1:
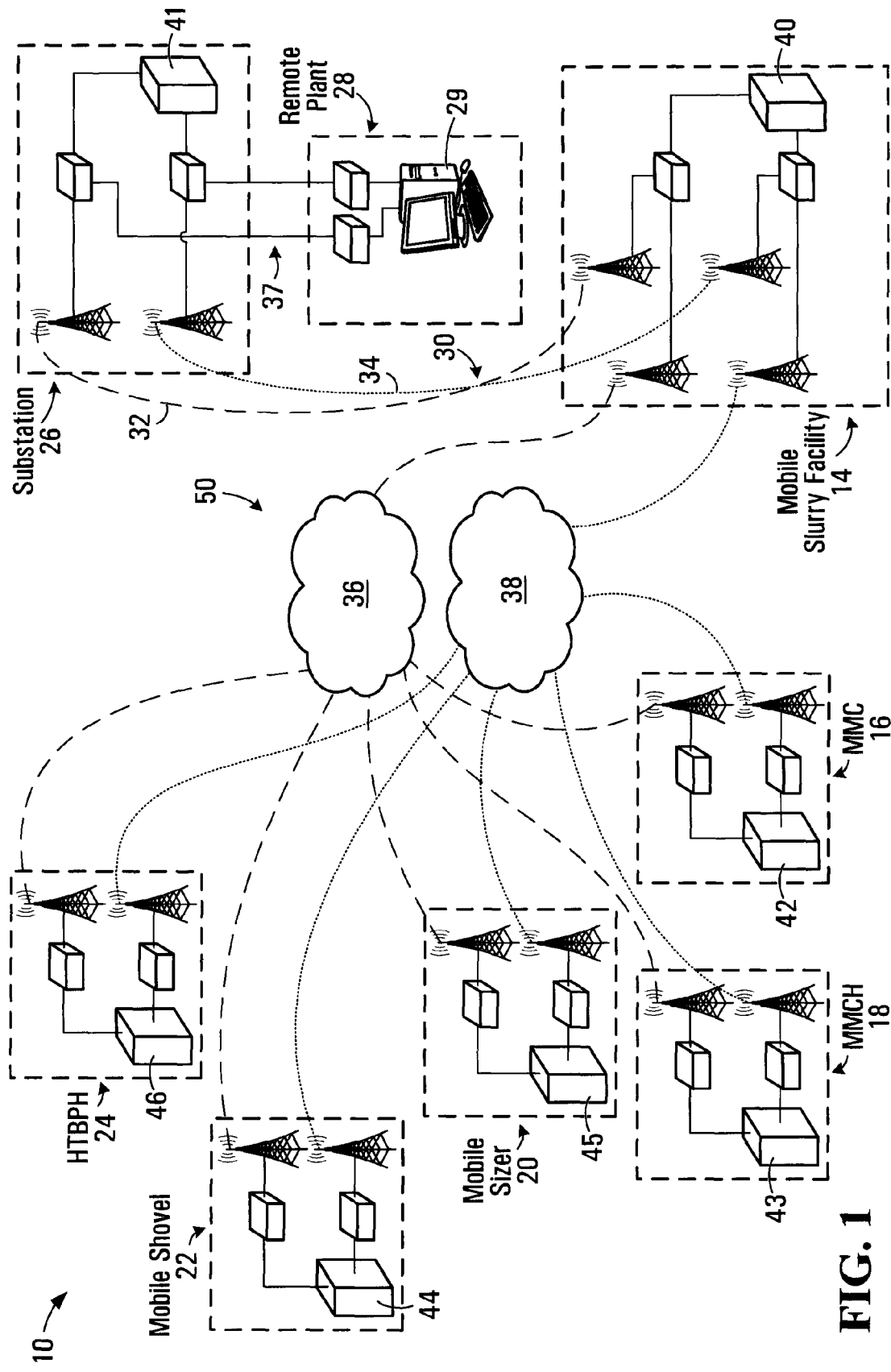
FIG. 1 is a block diagram of a network subsystem for a mobile oil sands extraction and processing facility according to a first embodiment of the present invention.
Figure 2:
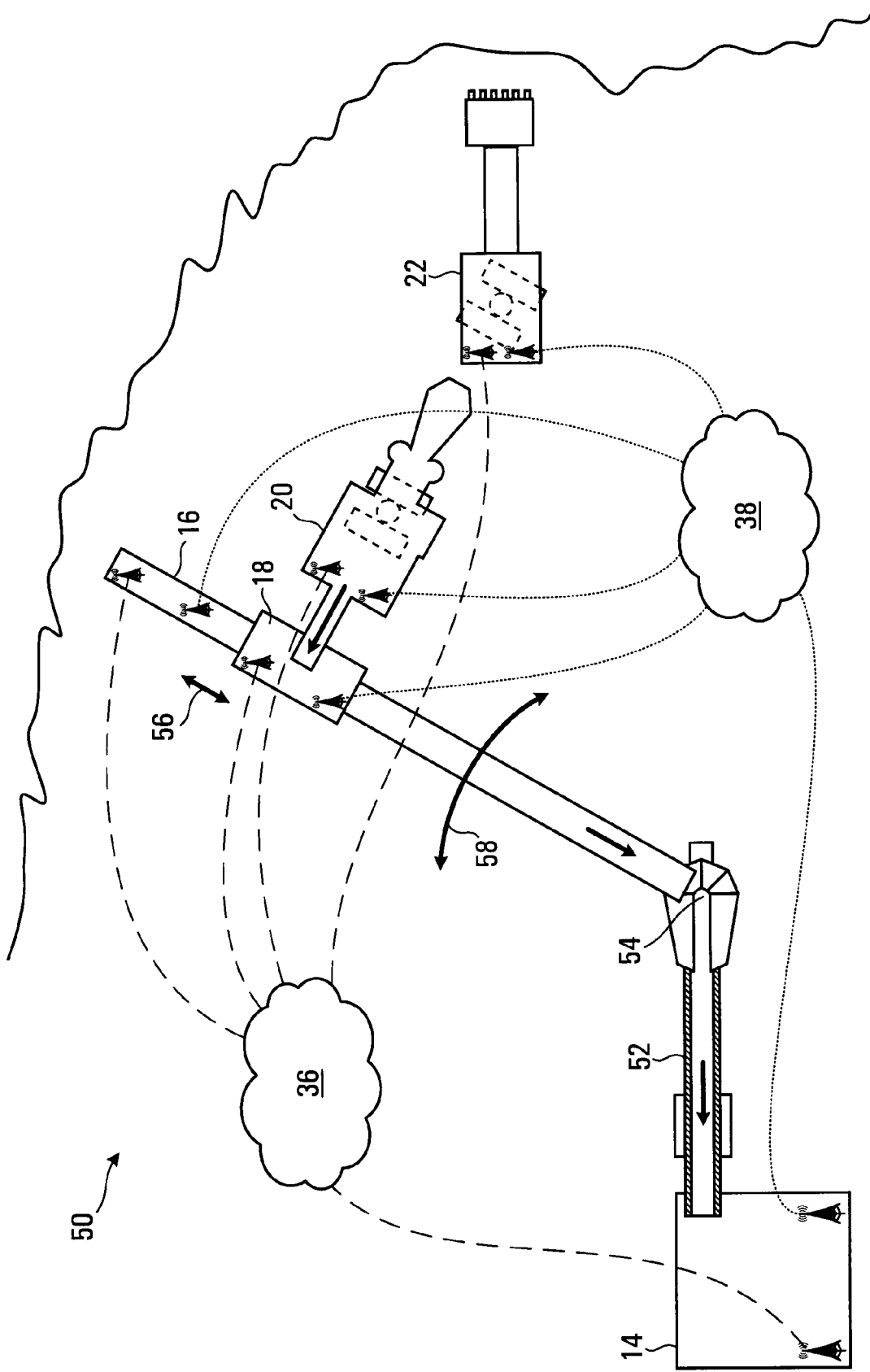
FIG. 2 is a top-view system diagram for the embodiment of the network subsystem for the mobile oil sands extraction and processing facility shown in FIG. 1.

Referring to FIGS. 1 and 2, there is shown a first embodiment of a system 10 for wireless process control, for use in the mining industry in accordance with one aspect of the present invention. In general terms, the system 10 comprises at least a first wireless network 36 and a second wireless network 38, which use different radio frequency bands that do not substantially interfere with each other. The first wireless network 36 is used to communicate real-time instructions and data between one or more pieces of mobile equipment to at least one other piece of mobile equipment. The second wireless network 38 is used to concurrently communicate the same or substantially the same real-time instructions and data as are communicated over the first wireless network 36. The concurrent operation of the two wireless networks supports a reliable system for remote monitoring and control of the mobile equipment, while minimizing the risk of an interruption or loss of communication of real-time instructions and data.

In the first embodiment, the system 10 includes a mobile mining process train 50 (or mobile mining process line) for use in the mobile excavation and mining of a mineable resource material. In operation, the mobile mining process train 50 is located proximate an open pit oil sands mine face and comprises a plurality of mobile mining equipment, including a mobile shovel 22, a mobile sizer 20, a mobile mining conveyor hopper (or MMCH) 18, a mobile mining conveyor (or MMC) 16 and a mobile slurry facility 14, although other types of mobile mining equipment may be used.

The mobile shovel 22 is operative to excavate the mineable resource material from a resource-bearing body, the excavated mineable resource material forming a mined material. In the first embodiment, the mined material comprises a bitumen-bearing formation material excavated from an oil sands deposit, although the mined material may comprise any other form of mineable resource material, including an ore-bearing material excavated from an ore-bearing body. The mobile sizer 20 is operative to receive the mined material from the mobile shovel 22 and to comminute the mined material to a conveyable size. Preferably, the mobile sizer 20 causes the mined material to have pieces of material that do not exceed a predetermined size. The mobile mining conveyor hopper 18 is operative to receive the mined material from the mobile sizer 20 for transfer at a regulated rate to the mobile mining conveyor 16. The mobile mining conveyor 16 is operative to receive the mined material from the mobile mining conveyor hopper 18 and to transport the mined material for processing downstream. The mobile slurry facility 14 is operative to receive the mined material from the mobile mining conveyor 16 and to size and combine it with water for transport to an extraction facility. The mobile mining process train 50 may include other pieces of equipment, including, for instance, a transfer conveyor 52 that acts as a bridge, receiving the mined material from the mobile mining conveyor 16 via the receiving end 54 and transporting the mined material to the mobile slurry facility 14. It will be noted that the pieces of mobile mining equipment identified above are illustrative of, but are not meant to limit, the types of mobile mining equipment that may be used in the system 10. For instance, the mobile sizer 20 may be any type of mobile comminuting device suitable for mining, including a mobile crusher. The mobile shovel 22 may also be any type of mobile excavator suitable for mining, including a mobile loader. In addition to supporting communications with the mobile mining equipment, the system 10 can also support communications with other sites and other forms of equipment, such as a hydro-transport booster pump house (HTBPH) 24 or another type of hydro-transport booster pump, which may be mobile or relocatable.

The system 10 cooperates with a remote plant 28 for monitoring the mobile mining process train 50 and for sending and receiving data to and from the mobile mining process train 50. Communication between the remote plant 28 and the mobile mining process train 50 may be accomplished directly or indirectly, including, for example, through a substation 26, wherein the substation 26 communicates over a first communication medium 30 with the mobile slurry facility 14 and the mobile slurry facility communicates over the first communication medium 30 with the rest of the mobile mining process train 50.

The first communication medium 30 is a wireless medium further comprising at least two wireless connections 32 and 34 that operate at substantially different radio frequency bands from each other. The wireless connections 32 and 34 provide concurrent point-to-point connections between the substation 26 and the hub of the mobile mining process train 50, which in the first embodiment is positioned on the mobile slurry facility 14. In the first embodiment, wireless connections 32 and 34 are an IEEE 802.11g wireless connection and an IEEE 802.11a wireless connection respectively, although other wireless communications standards may be used provided that the two wireless connections use different radio frequency bands that do not substantially interfere with each other.

In the first embodiment, the mobile slurry facility 14 serves as a gateway for the mobile mining process train 50, sending and receiving data between the mobile mining process train 50 and substation 26. The substation 26 serves as a communication interface for the remote plant 28 wherein communication between the substation 26 and remote plant 28 occurs over a second communication medium 37, which is, for illustration purposes, a single mode fiber, although other wired or wireless connections may be used for the second communication medium 37.

Communication in and between the mobile mining equipment, including the mobile slurry facility 14, is managed via the first wireless network 36 and the second wireless network 38. In the first embodiment, communication between the remote plant 28 and the mobile mining equipment of the mobile mining process train 50, other than the mobile slurry facility 14, is facilitated through the mobile slurry facility 14. The remote plant 28 (via the substation 26) communicates with the mobile slurry facility 14 while the other mobile mining equipment, such as the mobile mining conveyor 16, communicates with the mobile slurry facility 14 over both the first wireless network 36 and the second wireless network 38.

The first wireless network 36 operates using a radio frequency in accordance with the IEEE 802.11g standard. The second wireless network 38 operates using a different radio frequency in accordance with the IEEE 802.11a standard. It will be noted, however, that other wireless communications standards may be used for the first and second wireless networks provided that the two wireless networks use different radio frequency bands that do not substantially interfere with each other.

The wireless connections 32 and 34 provide real-time concurrent wireless connections between the mobile slurry facility 14 and substation 26, while the wireless networks 36 and 38 provide real-time concurrent wireless connections between the mobile slurry facility 14 and the other pieces of mobile mining equipment in the mobile mining process train 50.

Figure 3:
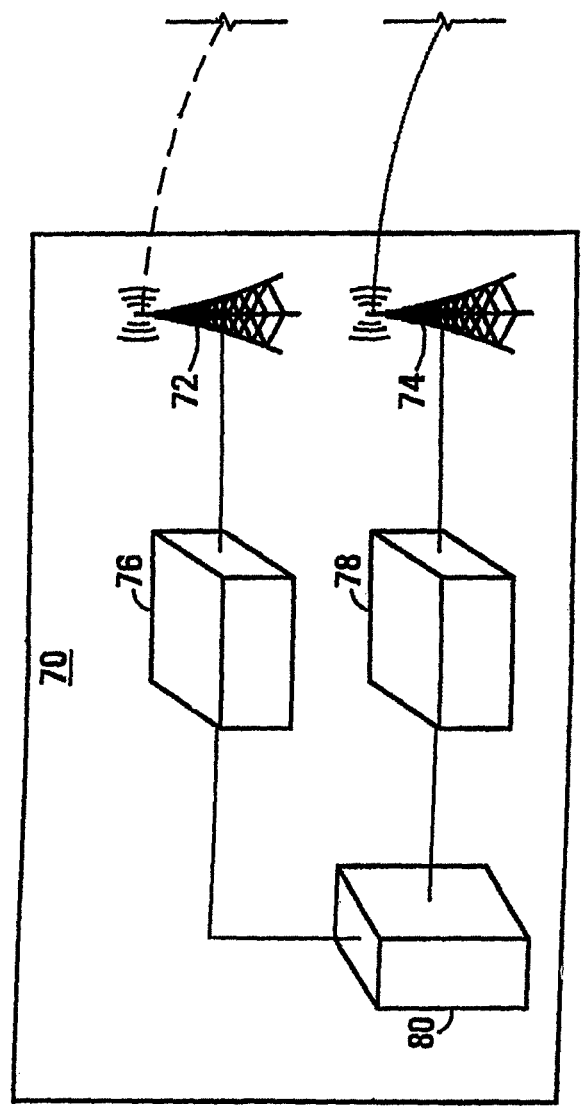
FIG. 3 is a diagram representing the communication and control portion of the mobile mining equipment in a mobile mining train of the network subsystem shown in FIG. 1.

Referring to FIGS. 1, 2 and 3, the mobile equipment communication and control portion of the system 10 for each of the pieces of mobile mining equipment of the mobile mining train 50 is shown in more detail at 70. Each of the mobile mining equipment has positioned on it an equipment data collector and controller 80 that collects a set of status and operational data from the corresponding piece of mobile mining equipment, and is operative to control at least one feature of the corresponding piece of mobile mining equipment. Instances of the equipment data collector and controller 80 shown in FIG. 1 include those referenced at 40, 41, 42, 43, 44, 45 and 46.

Each equipment data collector and controller 80 includes a programmable logic controller (PLC) programmed to support to the operation of the respective equipment data collector and controller. Each of the pieces of mobile mining equipment also has positioned on it, either as part of or in communication with the applicable equipment data collector and controller 80, a first wireless bridge 76, a second wireless bridge 78, a first antenna 72, and a second antenna 74. The first wireless bridge 76 communicates instructions and data between the equipment data collector and controller 80 and the first antenna 72 while the second wireless bridge 78 communicates instructions and data between the equipment data collector and controller 80 and the second antenna 74. The first antenna 72 communicates via the first wireless network 36 transmitting the first set of status and operational data for processing and receiving data and instructions for controlling the equipment data collector and controller 80. The second antenna 74 communicates via the second wireless network 38 transmitting, concurrent with the same or substantially the same data transmitted via the first antenna 72, the first set of status and operational data for processing, and receiving, concurrent with the same or substantially the same data and instructions received by the first antenna 72, data and instructions for controlling the equipment data collector and controller 80.

The establishing of the first wireless network 36 for monitoring and controlling the plurality of pieces of mobile mining equipment includes configuring a first set of wireless bridges comprising a plurality of the first wireless bridges 76 to communicate according to a first frequency band.

The establishing of the second wireless network 38 for monitoring and controlling the plurality of pieces of mobile mining equipment concurrently with the first wireless network 36 includes configuring a second set of wireless bridges comprising a plurality of second wireless bridges 78 to communicate according to a second radio frequency band substantially different from the first radio frequency band. The second set of wireless bridges preferably communicate substantially the same data concurrently transmitted by corresponding ones of the first set of wireless bridges.

Once the first and second wireless networks 36 and 38 have been established, a set of status and operational data are collected from each of the plurality of mobile mining equipment via the equipment data collector and controller 80 positioned on each of the plurality of mobile mining equipment so as to form collected sets of status and operational data.

Although in the first embodiment a single equipment data collector and controller is positioned on each piece of mobile mining equipment, it will be noted that alternatively two or more equipment data collectors and controllers may be positioned on each piece of mobile mining equipment that each communicate over the first and second wireless networks 36 and 38 via the first and second wireless bridges 76 and 78. In yet another variation, the two wireless bridges 76 and 78 may be replaced with a single wireless bridge that is operative to communicate on both the first and second wireless networks 36 and 38 via one or more antennae.

In the first embodiment shown in FIG. 1, the remote plant 28 comprises a host equipment control computer 29 that is operative to communicate with the mobile mining equipment over the wireless connections 32 and 34 via the mobile slurry facility 14, and is operative to control at least a set of features on the mobile mining process train 50. The host equipment control computer 29 includes an equipment monitoring and control program stored on a computer-readable media and adapted to instruct the host equipment control computer 29 to perform the operations described below for the host equipment control computer 29. The computer-readable media may be of one or more types, including volatile memory such as Random Access Memory (RAM), and non-volatile memory, such as a hard disk or Read Only Memory (ROM).

The collected sets of status and operational data from the first and second wireless bridges 76 and 78 positioned on the plurality of mobile mining equipment are transmitted via the first and second wireless networks 36 and 38 to the host equipment control computer 29.

The host equipment control computer 29 is programmed to monitor for and process status and operational data specific to each of the pieces of equipment in the mobile mining process train 50. The status and operational data is received via both the first and second wireless bridges 76 and 78 (FIG. 3) positioned on the mobile slurry facility 14 over the wireless connections 32 and 34. The status and operational data may include control data and run status data for each of the mobile mining equipment in the mobile mining process train 50. At least part of each set of status and operational data is provided by the host equipment control computer 29 for display on a user interface displayed on a display device connected to the host equipment control computer 29 or a remote computer in communication with the host equipment control computer.

Thus, the host equipment control computer 29 is operatively configured for processing at least part of the collected sets of status and operational data received from the first and second wireless bridges 76 and 78 and their associated antennae 72 and 74 (see FIG. 3) via the first and second wireless networks 36 and 38.

Figure 4:
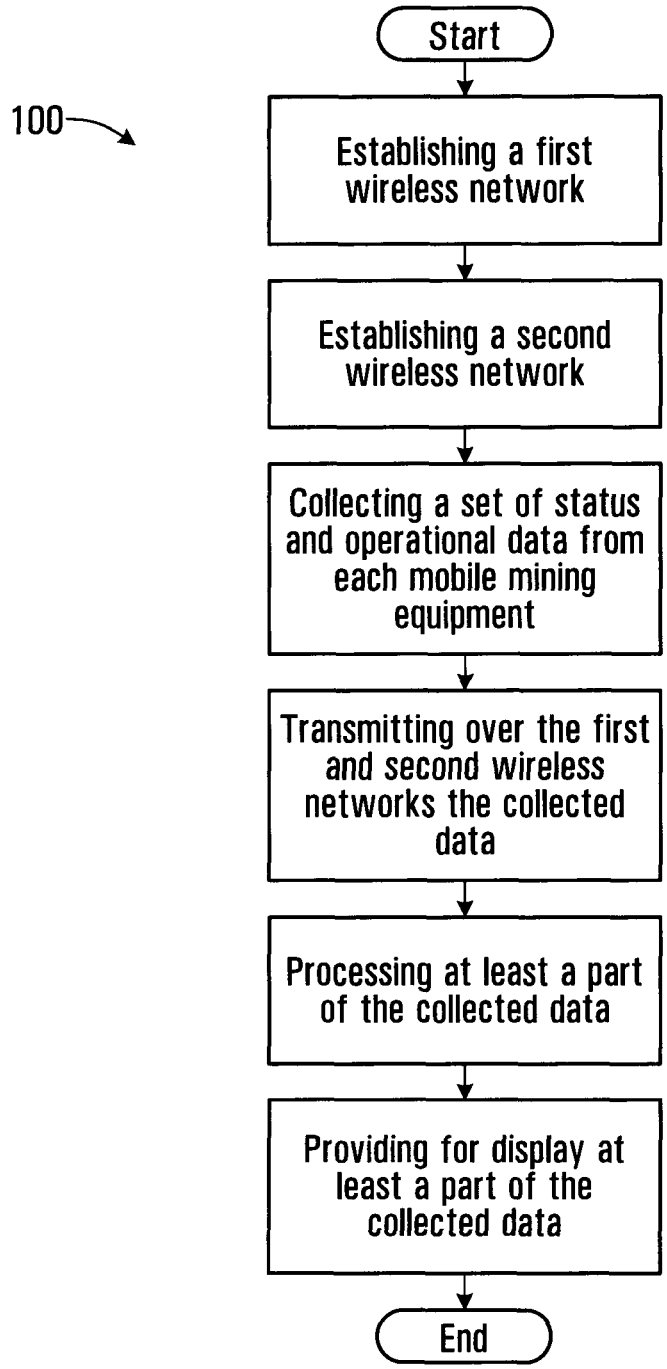
FIG. 4 is a flow chart depicting a method of monitoring and controlling a plurality of mobile mining equipment according to an embodiment of the invention.

The method of monitoring and controlling a plurality of mobile mining equipment including the establishing of the first and second wireless networks 36 and 38, the collecting and transmitting of the status and operational data, and subsequent process and display of the data is shown generally at 100 in FIG. 4.

Figure 8:
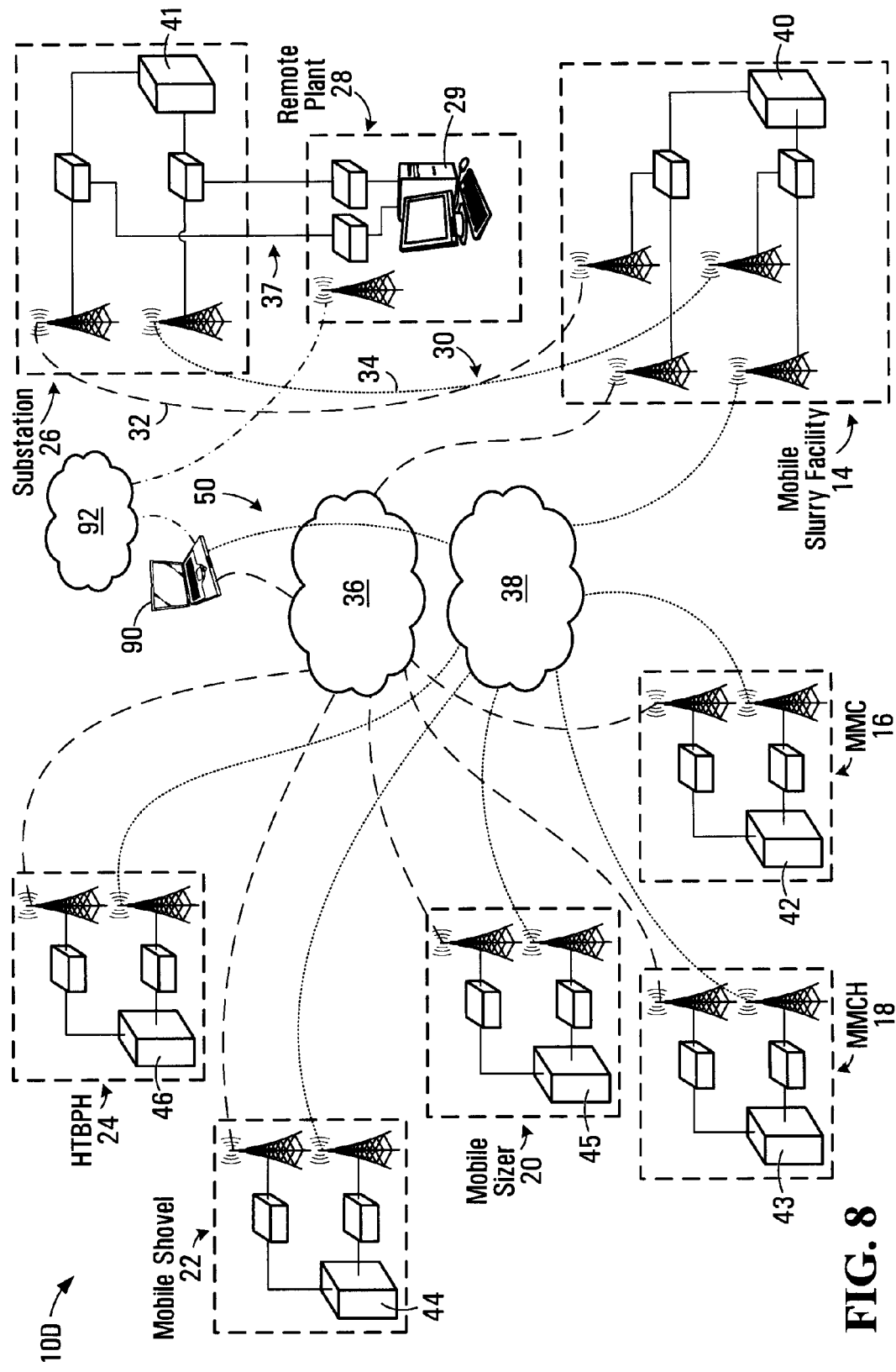
FIG. 8 is a block diagram of a network subsystem for a mobile oil sands extraction and processing facility according to yet another embodiment.

The host equipment control computer 29 is preferably programmed to permit a user to control at least one piece of the mobile mining equipment of the mobile mining process train 50 via the host equipment control computer 29 or a remote computer such as the wireless personal computing device 90 (FIG. 8). This allows the user to control one or more features of one or more of the pieces of mobile mining equipment including the mobile slurry facility 14 and mobile sizer 20. In another variation, the host equipment control computer 29 is preferably programmed to control and operate, in addition or in the alternative, the mobile shovel 22 or other pieces of mobile mining equipment.

In another variation, the host equipment control computer 29 may be configured for providing at least part of the collected sets of status and operational data for display on a user interface of a field operator's personal computing device operative to remotely monitor and control at least a portion of the features of the plurality of mobile mining equipment. In yet another variation, the host equipment control computer 29 may be positioned on one of the pieces of mobile mining equipment, for example on the mobile slurry facility 14. Having the host equipment control computer 29 located on the mobile slurry facility 14 or another piece of mobile mining equipment allows for local control and operation of the mobile mining equipment even if the connection to the remote plant 28 is lost. Local control and operation via the host equipment control computer 29 can enable a user such as an operator or controller to have improved visibility of the mobile equipment while operating same via the host equipment control computer 29 through the wireless networks 36 and/or 38. In yet another variation, the host equipment control computer 29 is a personal computing device, such as a wireless laptop computer.

It will be noted that the wireless connections 32 and 34 and the wireless networks 36 and 38 provide for the same or substantially the same data to be transmitted and received over a plurality of connections, which provides for the ability of the system 10 to remain operational so long as at least one of the wireless connections 32 and 34 and at least one of the wireless networks 36 and 38 are operational.

In order to monitor for and respond to interruptions in communications over the system 10, the host equipment control computer 29 is programmed to generate and provide a network activity alert signal to the user interface, if one of the first and second wireless networks 36 and 38 is interrupted including if communication is lost with any wireless bridge within one of the first and second wireless networks 36 and 38 for at least a predetermined time limit. In the first embodiment the predetermined time limit is set at 10 seconds, although other longer or shorter time limits may be used to meet the desired sensitivity of the system. For example, the predetermined time limit may be anywhere from about 600 milliseconds to about 10 seconds or more, depending on the distance between pieces of the mobile mining equipment. For shorter distances, such as when pieces of mobile mining equipment are about 300 to about 900 meters apart, the predetermined time limit may be about 600 milliseconds to about 1.5 seconds. For situations when pieces of mobile mining equipment or other equipment in the system 10 are spaced apart by at least about 1 km or more, the predetermined time limit is preferably no less than about 2 or 2.5 seconds, so as to provide time for round trip communications to occur with some lag without triggering a network activity alert signal warning of a possible loss of communication. In environments where more adaptability to potential, short interruptions may occur (such as due to intervening vehicles temporarily blocking a signal), a higher predetermined time limit is preferred, such as no less than about 3 seconds or more preferably yet about 4 seconds. This adds some further slack without triggering a network activity alert signal, and thereby adds further capacity for the networks to operate in the presence of minor lag, for instance where distances between points of communication extend to about 1 km or more.

The host equipment control computer 29 is also programmed to generate and provide an equipment failure alert signal for further processing or for display on the user interface, if the run status data received for any piece of mobile mining equipment in the mobile mining process train 50 indicates that the corresponding piece of mobile mining equipment has a failure falling within a predetermined class of critical failures. Preferably, the equipment failure alert signal identifies the corresponding piece of mobile mining equipment that has failed.

In response to the equipment failure alert signal, the host equipment control computer 29 is preferably programmed to initiate a first type of shutdown of at least the portion of the plurality of mobile mining equipment in the mobile mining process train 50 affected by the equipment failure. In this case, the mobile mining equipment affected by the equipment failure is or are preferably identified by the equipment failure alert signal. The first type of shutdown is preferably adapted to occur according to a first predetermined shutdown sequence adapted to at least the portion of the plurality of mobile mining equipment identified by the equipment failure alert signal as having the equipment failure. The predetermined shutdown sequence may also be adapted to other mobile mining equipment affected by an interruption in the operation of the mobile mining equipment having the equipment failure. In yet another arrangement, when the equipment failure alert signal identifies a critical equipment failure, the first type of shutdown is adapted to shut down all or substantially all of the operations of the mobile mining process train 50.

The host equipment control computer 29 preferably monitors, according to a predetermined verification schedule, the operability of each of the first and second wireless networks 36 and 38 by transmitting, via the mobile slurry facility 14, unique device identifiers to each of the first and second wireless bridges 76 and 78 positioned on each piece of mobile mining equipment in the mobile mining process train 50. For each unique device identifier transmitted, the host equipment control computer 29 is instructed to monitor for receipt, via the corresponding wireless bridge positioned on the mobile slurry facility 14, of a receipt confirmation signal in less than the predetermined time limit from the corresponding wireless bridge (and associated antenna) of the corresponding piece of equipment in the mobile mining process train 50.

In addition, two or more of the equipment data collectors and controllers or the corresponding wireless communication equipment (e.g. corresponding wireless bridges and antennae), may be adapted, over the predetermined verification schedule, to transmit to and wait for confirmed receipt from each other heartbeat signals containing a unique identifier associated with the particular target recipient device. Failure to receive a confirmed receipt in the form of a return signal within the first predetermined time limit, or optionally within a second predetermined time limit different from the first predetermined time limit, results in detection of an interruption, which is then sent to the host equipment control computer 29. In one variation, this approach may be used to have any piece of mobile mining equipment transmit heartbeat signals and other signals to all other pieces of mobile mining equipment in the mobile mining process train 50 that have an interlock relationship with the piece of mobile mining equipment transmitting the heartbeat signals or other signals.

If either or both of the first and second wireless networks 36 and 38 are concurrently interrupted for at least the predetermined time limit, a network failure alert signal is provided by the host equipment control computer 29 to the applicable user interface. For instance, the network failure alert signal will be sent to the user interface if communications are lost with at least one wireless bridge in either or both each of the first and second wireless networks 36 and 38 for at least the predetermined time limit. The network failure alert signal preferably indicates which wireless bridges have lost communication. If the host equipment control computer 29 identifies a failure of both the first and second wireless networks 36 and 38, or at least one wireless connection in each of the first and second wireless networks 36 and 38, then the host equipment control computer 29 initiates a second type of shutdown of at least the portion of the mobile mining process train 50 affected by the applicable failure. The second type of shutdown is preferably adapted to occur according to a second predetermined shutdown sequence at least adapted to or for the portion of the mobile mining process train 50 affected by the failure of the first and second wireless networks 36 and 38. In yet a more preferable arrangement, the second type of shutdown is adapted to shut down all or substantially all of the operations of the mobile mining process train 50.

In the first embodiment shown in FIG. 1, the equipment data collector and controller 40 positioned on the mobile slurry facility 14 is operative to receive status and operational data concurrently over both the first wireless network 36 and the second wireless network 38 from each of the other pieces of mobile mining equipment in the mobile mining process train 50. In this embodiment, the equipment data collector and controller 40 positioned on the mobile slurry facility 14 can be adapted to monitor, via both the first and second wireless networks 36 and 38, a first set of operating conditions associated with the mobile mining conveyor 16. The equipment and data collector and controller 40 is programmed to commence a shutdown sequence for the mobile slurry facility 14 if, as one of the first operating conditions, an error condition is detected in association with the mobile mining conveyor 16 indicating at least one of: a failure in the operation of the mobile mining conveyor 16, an emergency shutdown of the mobile mining conveyor 16, a fire alarm associated with the mobile mining conveyor 16, a communication failure with the mobile mining conveyor 16, or a misalignment of the mobile mining conveyor 16 in association with the mobile slurry facility beyond a predetermined set of alignment parameters.

The equipment data collector and controller 40 can also be adapted to monitor, via both the first and second wireless networks 36 and 38, a second set of operating conditions associated one or more of the mobile sizer 20, the mobile shovel 22 or the hydro-transport booster pump house (HTBPH) 24. In this instance, the equipment and data collector and controller 40 can be configured to commence a shutdown sequence for the mobile slurry facility 14 if, as one of the second operating conditions, an error condition is detected in association with one or more of the mobile sizer 20, the mobile shovel 22 or the hydro-transport booster pump house (HTBPH) 24 indicating a failure in downstream pumps associated with the HTBPH 24 or a communication failure with one or more of the mobile sizer 20, the mobile shovel 22 or the HTBPH 24.

The equipment data collector and controller 42 positioned on the mobile mining conveyor 16 can be adapted to monitor, via both the first and second wireless networks 36 and 38, a third set of operating conditions associated with the mobile mining conveyor hopper 18. In this instance, the equipment and data collector and controller 42 can be configured to commence a shutdown sequence for the mobile mining conveyor 16 if, as one of the third set of operating conditions, an error condition is detected in association with the mobile mining conveyor hopper 18 indicating a communication failure with the mobile mining conveyor hopper 18.

The equipment data collector and controller 42 can also be adapted to monitor, via both the first and second wireless networks 36 and 38, a fourth set of operating conditions associated with the mobile slurry facility 14. In this instance, the equipment and data collector and controller 42 can be configured to commence a shutdown sequence for the mobile mining conveyor 16 if, as one of the fourth operating conditions, an error condition is detected in association with the mobile slurry facility 14 indicating at least one of: a failure in the operation of the mobile slurry facility 14, an emergency shutdown of the mobile slurry facility 14, a fire alarm associated with the mobile slurry facility 14, or a communication failure with the mobile slurry facility 14.

The equipment data collector and controller 45 positioned on the mobile sizer 20 can be adapted to monitor, via both the first and second wireless networks 36 and 38, a fifth set of operating conditions associated with the mobile mining conveyor hopper 18. In this instance, the equipment and data collector and controller 45 can be configured to commence a shutdown sequence for the mobile sizer 20 if, as one of the fifth operating conditions, an error condition is detected in association with the mobile mining conveyor hopper 18 indicating at least one of: a failure in the operation of the mobile mining conveyor hopper 18, an emergency shutdown of the mobile mining conveyor hopper 18, a fire alarm associated with the mobile mining conveyor hopper 18, or a communication failure with the mobile mining conveyor hopper 18.

The equipment data collector and controller 44 can also be adapted to monitor, via both the first and second wireless networks 36 and 38, a sixth set of operating conditions associated with the mobile mining conveyor 16. The equipment and data collector and controller 44 will commence a shutdown sequence for the mobile shovel 22 if, as one of the sixth operating conditions, an error condition is detected in association with the mobile mining conveyor 16 indicating at least one of: a failure in the operation of the mobile mining conveyor 16, an emergency shutdown of the mobile mining conveyor 16, a fire alarm associated with the mobile mining conveyor 16, or a communication failure with the mobile mining conveyor 16.

Figure 5:
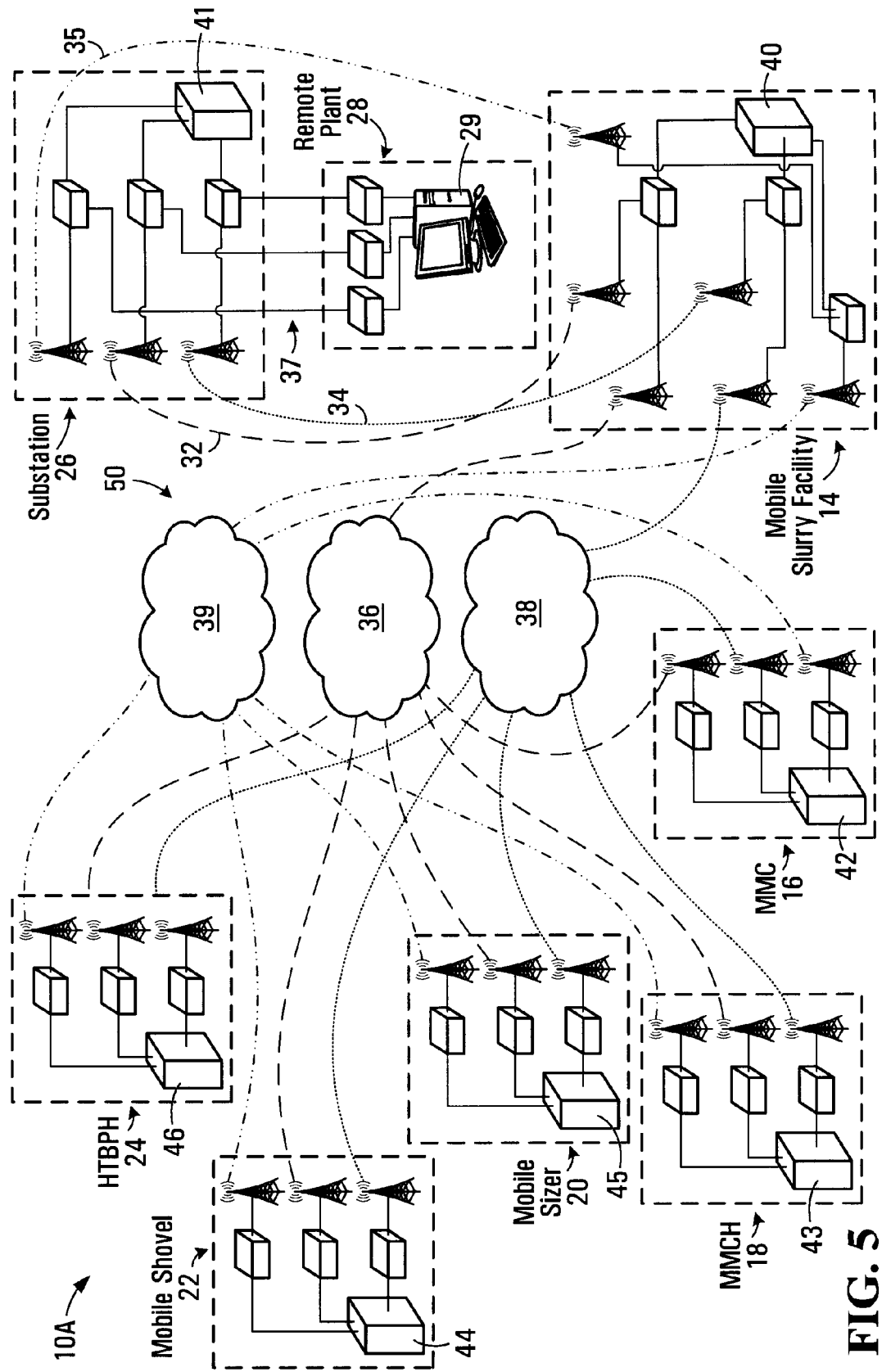
FIG. 5 is a block diagram of a network subsystem for a mobile oil sands extraction and processing facility according to another embodiment.

Referring to FIG. 5, there is shown a system 10A, which is an alternate embodiment of the system 10 in FIG. 1, wherein a third wireless connection 35 and a third wireless network 39 are included. The third wireless connection 35 provides an additional connection (in addition to first and second wireless connections 32 and 34) for communication between the mobile slurry facility 14 and the substation 26. The third wireless network 39 provides an additional network connection for communication between each of the pieces of mobile mining equipment of the mobile mining process train 50. Each communication device within the third wireless network 39 operates at a radio frequency band different than that of the radio frequency bands of the first and second wireless networks 36 and 38. The third wireless connection 35 also operates at the same radio frequency as the third wireless network 39.

The third wireless connection 35 and a third wireless network 39 may be adapted to support the concurrent communication of the same or substantially the same data and instructions as that which is communicated over wireless connections 32 and 34 and over wireless networks 36 and 38. In this configuration, the third wireless connection 35 and a third wireless network 39 provide a yet further level of reliability to the wireless communication of data and instructions between the various pieces of mobile mining equipment in the mobile mining process train 50 and between the mobile slurry facility 14 and the remote plant 28 via substation 26.

In another alternative, the third wireless connection 35 and a third wireless network 39 may be adapted to support the concurrent communication of different data and instructions from that which is communicated concurrently over wireless connections 32 and 34 and over wireless networks 36 and 38. In this configuration the third wireless connection 35 and a third wireless network 39 can be used to provide segmented communication of data and instructions associated with features of the mobile mining equipment not communicated over wireless connections 32 and 34 and over wireless networks 36 and 38. For example, the third wireless connection 35 and a third wireless network 39 may be adapted to communicate data and instructions associated with non-critical features of the mobile mining process train 50 (e.g. data and instructions that do not need to be monitored or controlled for emergency shutdown purposes, such as video data or routine maintenance information). Transferring communication of non-critical data and instructions to the third wireless connection 35 and a third wireless network 39 allows one to minimize the risk of overloading critical communications transmitted concurrently over both the wireless connections 32 and 34 and over wireless networks 36 and 38.

In one variation, the third wireless network 39 may be configured according to the same communications standard as the first wireless network 36, but allocated a dedicated channel of the communications standard that is sufficiently different from other channels making up the communications standard so as to minimize the risk of interference between the first and third wireless networks. For example, where the first wireless network 36 is configured for 802.11g and the third wireless network 39 may also be configured for 802.11g, provided the third wireless network 39 is allocated a select dedicated channel within 802.11g different from the channels used by the first wireless network 36 within the 802.11g standard. In such an arrangement, the first wireless bridges forming part of the first wireless network 26 are preferably configured to provide the select dedicated channel to the third wireless network 39. In one arrangement of this variation, each antenna used for the first wireless network 36, when positioned on a piece of mobile mining equipment, is spaced apart at least about 2 meters from the antenna used for the third wireless network.

Figure 6:
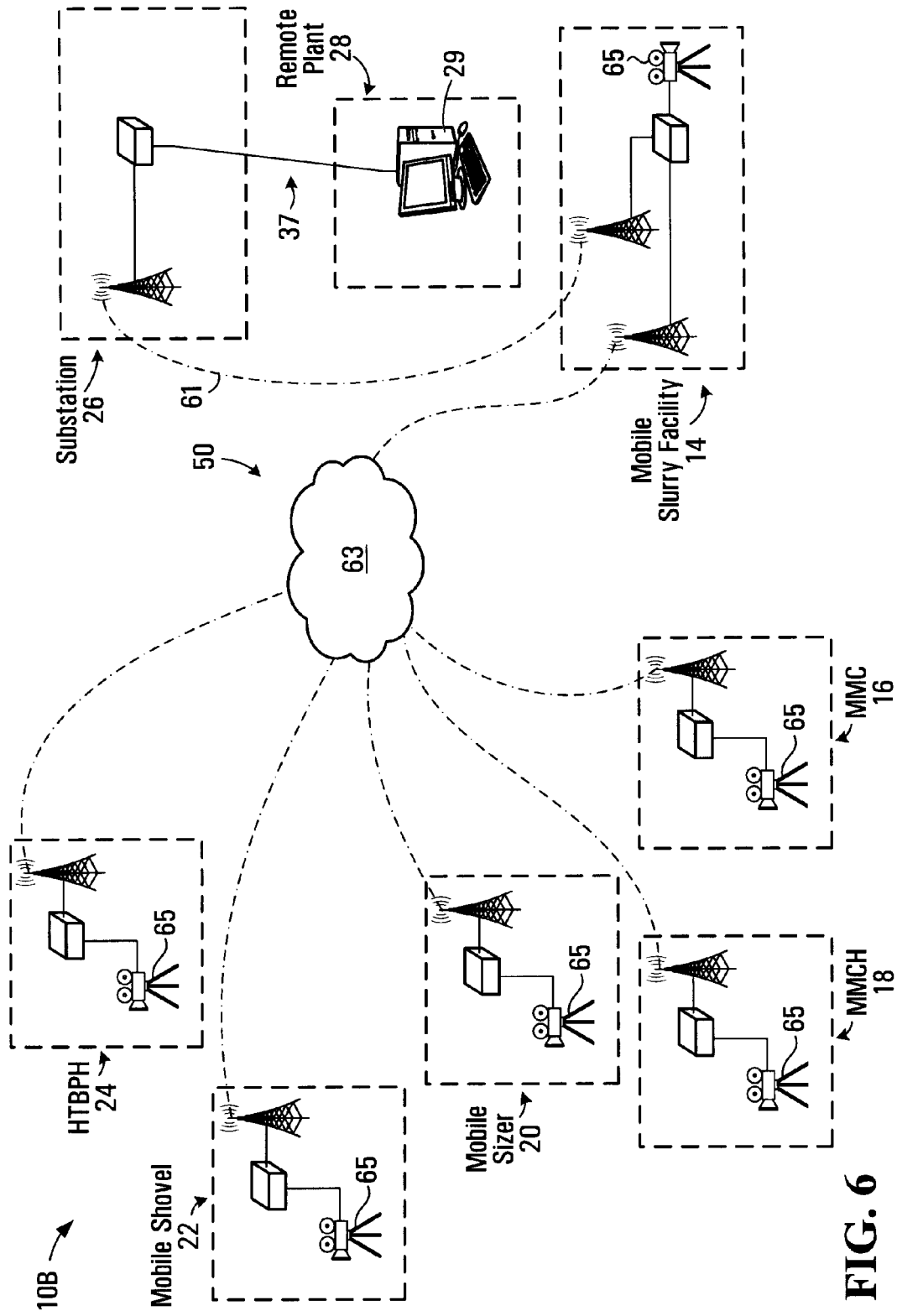
FIG. 6 is a block diagram of a network subsystem for a mobile oil sands extraction and processing facility according to yet another embodiment.

Referring to FIGS. 5 and 6, a further variation (10B) of system 10A is provided involving another embodiment of a third wireless connection 35 and a third wireless network 39. In FIG. 6 wireless connection 61 is equivalent to third wireless connection 35 and wireless network 63 is equivalent to third wireless network 39. In the variation shown in FIG. 6, wireless connection 61 and wireless network 63 operate on the same radio frequency band, which is sufficiently different from that of the radio frequency bands of wireless connections 32 and 34 and wireless networks 36 and 38 so as not to interfere with wireless connections 32 and 34 and wireless networks 36 and 38. It should be noted that the wireless connection 61 and the wireless network 63 may operate on different radio frequency bands from each other if desired, provided they do not interfere with the communications over wireless connections 32 and 34 and wireless networks 36 and 38. In the embodiment shown in FIGS. 5 and 6 combined, each of the mobile slurry facility 14, the mobile mining conveyor 16, the mobile mining conveyor hopper 18, the mobile sizer 20, and the mobile shovel 22 are fitted with one or more cameras 65. Video feed from the cameras 65 is transmitted over the wireless network 63 and wireless connection 61 to the remote plant 28 allowing a user to visually monitor each of the mobile mining equipment of the mobile mining process train 50 as well as the surrounding operating conditions. The video feed may also be viewed at a facility or a computer not located within the remote plant 28. For example, the video feed may be viewed on the personal computing device 90 as shown in the embodiment of FIG. 8.

Figure 7:
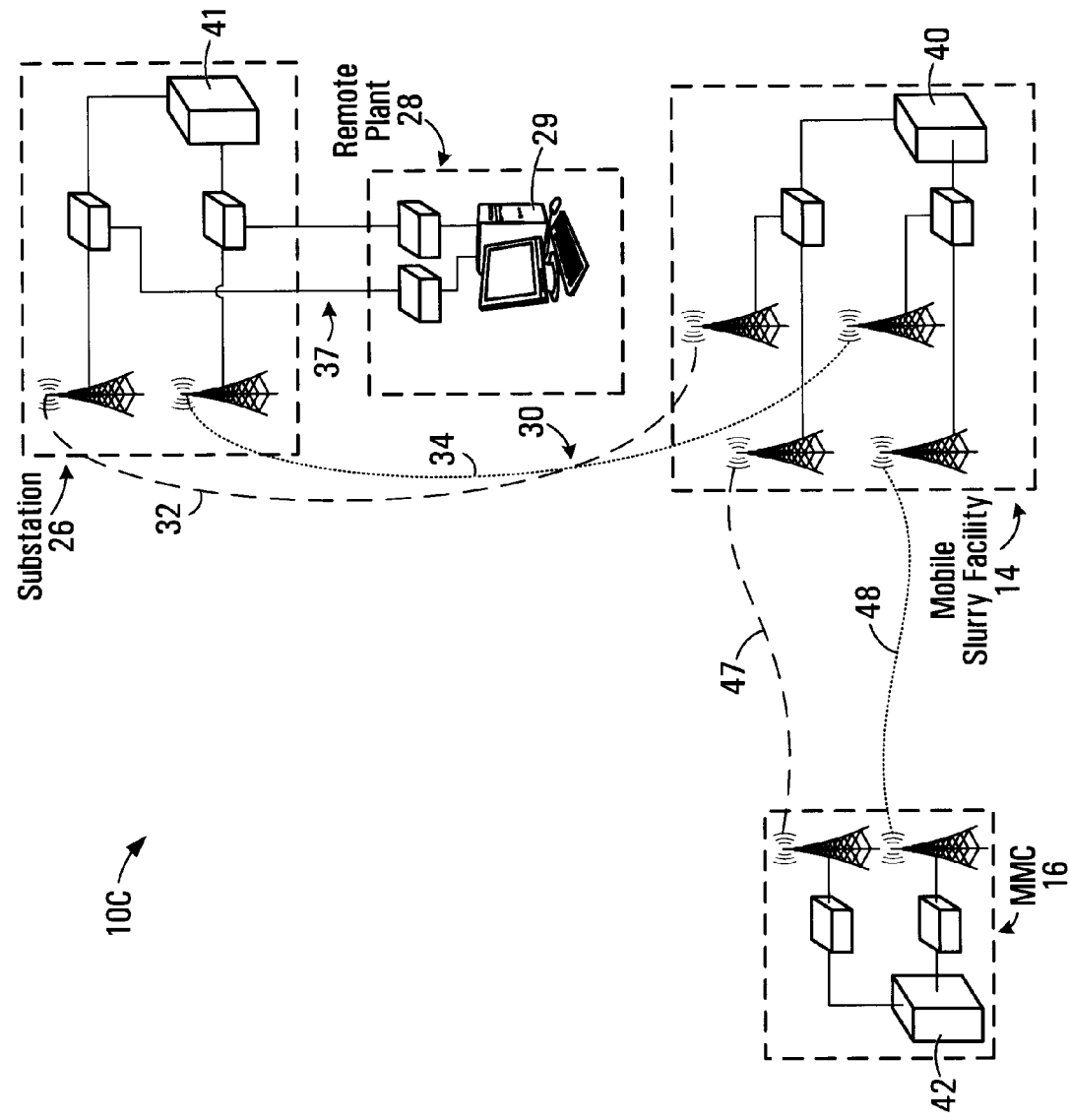
FIG. 7 is a block diagram of a network subsystem for a mobile oil sands extraction and processing facility according to yet another embodiment.

Referring to FIG. 7, a simplified system 10C is shown, which is a variation of the system 10 in FIG. 1. In FIG. 7, the system 10C provides for communication between a minimum of two pieces of mobile mining equipment making up the mobile mining process train 50 shown in FIG. 1. In this variation, for illustration purposes, the mobile mining equipment used are the mobile slurry facility 14 and the mobile mining conveyor 16, although other sets of mobile mining equipment may be selected for purposes of wireless communication. In this embodiment, the mobile mining conveyor 16 communicates with the mobile slurry facility 14 concurrently over both a fourth wireless connection 47 and a fifth wireless connection 48. Wireless connections 47 and 48 provide a point-to-point wireless connection between the mobile mining conveyor 16 and mobile slurry facility 14. The radio frequency band of wireless connection 47 is different from the radio frequency band of wireless connection 48, so as to avoid interference between the two concurrently operating connections.

Referring to FIG. 8, in another variation (10D) of the system 10 in FIG. 1, a personal computing device 90, such as a personal laptop computer, may be provided in addition to or in substitution of the host equipment control computer 29. The personal computing device 90 is operative to communicate wirelessly with the mobile mining equipment of the mobile mining process train 50 via the first and second networks 36 and 38. The personal computing device 90 also comprises an instance of the equipment monitoring and control program stored on a computer-readable media local to or in communication with the personal computing device 90. In an alternative embodiment, the personal computing device 90 may communicate with the mobile mining equipment indirectly via another network 92 such as the Internet or an intranet with which a secure communication is established directly or indirectly, for instance via the substation 26 or the remote plant 28.

Figure 9:
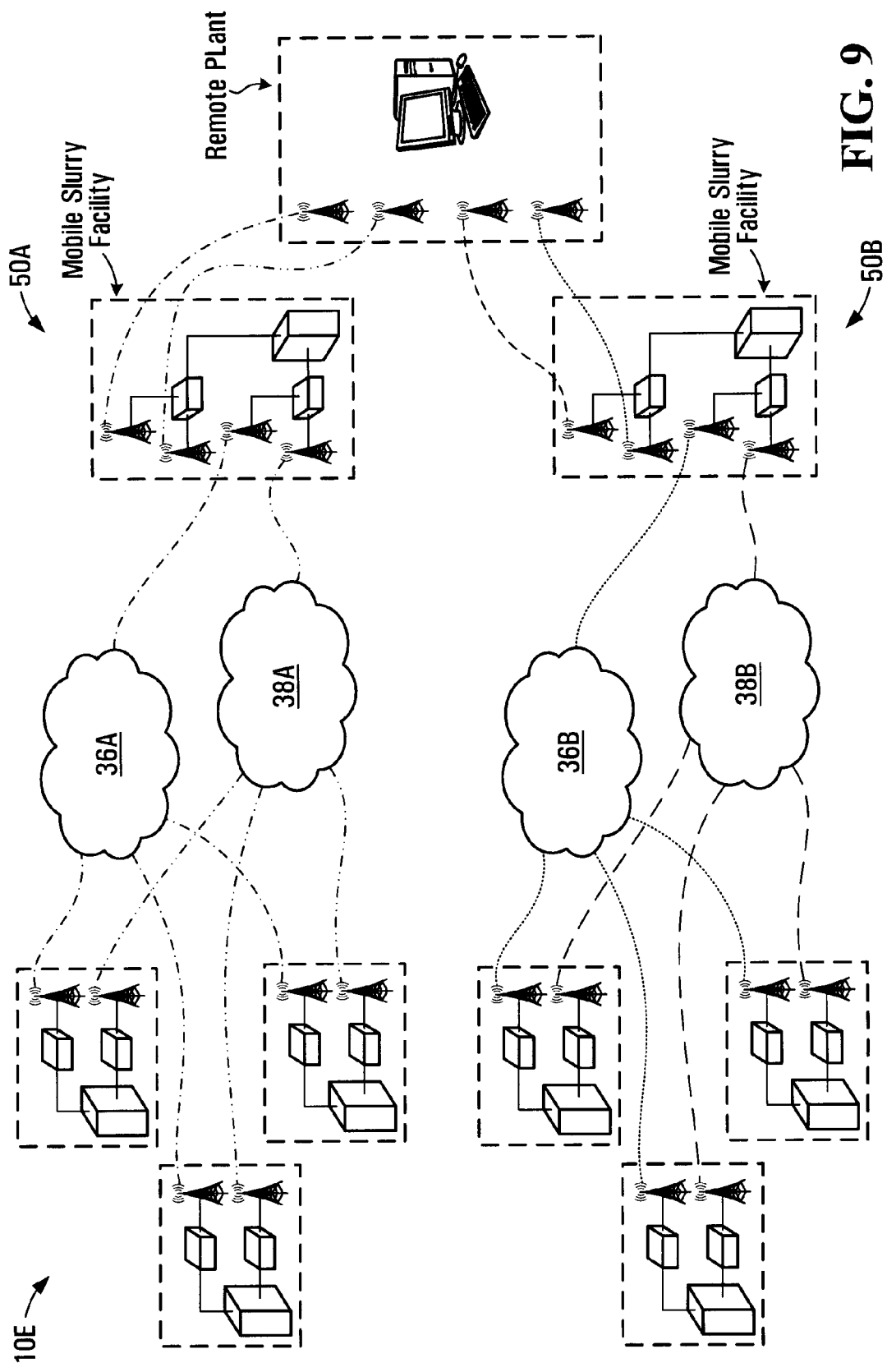
FIG. 9 is a block diagram of a network subsystem for a mobile oil sands extraction and processing facility according to yet another embodiment.

In another variation, a system 10E is shown in FIG. 9, which corresponds to a variation of the system 10 shown in FIG. 1, further adapted to cooperate with a plurality of mobile mining process trains. For instance, the system 10E may be adapted to cooperate with both a first mobile mining process train 50A over a first wireless network 36A and a second wireless network 38A, and with a second mobile mining process train 50B over a third wireless network 36B and a fourth wireless network 38B. In this variation, the second mobile mining process train 50B is remote from the first mobile mining process train 50A, and the second mobile mining process train 50B includes a second plurality of mobile mining equipment. The system 10E can include a second plurality of equipment data collectors and controllers each positioned on a corresponding one of the second plurality of mobile mining equipment. Each of the second plurality of equipment data collectors and controllers is operative to collect a set of status and operational data from the corresponding one of the second plurality of mobile mining equipment, and is operative to control at least one feature of the corresponding one of the second plurality of mobile mining equipment. In addition, each of the second plurality of equipment data collectors and controllers is preferably in communication with a third wireless bridge and a fourth wireless bridge.

Each third wireless bridge is (a) configured to communicate according to yet another radio frequency band, (b) positioned on the corresponding one of the second plurality of mobile mining equipment, (c) operative to transmit the second set of status and operational data for processing and (d) operative to receive data and instructions for controlling the corresponding equipment data collector and controller. Each fourth wireless bridge is (a) positioned on the corresponding one of the second plurality of mobile mining equipment, (b) operative to communicate according to a further radio frequency band substantially different from the yet another radio frequency band, (c) operative to transmit, concurrent with the same or substantially the same data transmitted by the third wireless bridge, the first set of status and operational data for central processing, and (d) operative to receive, concurrent with the same or substantially the same data and instructions received by the third wireless bridge, data and instructions for controlling the corresponding equipment data collector and controller. The third wireless bridges collectively form the third wireless network 36B and the fourth wireless bridges collectively form the fourth wireless network 38B, in addition to the first wireless network 36A and the second wireless network 38A established for the first mobile mining process train 50A as illustrated and described above in connection with FIG. 1.

The data collector and controller positioned on the second mobile slurry facility is preferably further operative to receive status and operational data concurrently over both the third wireless network and the fourth wireless network from each of the other data collectors and controllers positioned on the other pieces of equipment in the second mobile mining process train.

In this variation (10E) the equipment monitoring and control program preferably comprises computer-readable instructions adapted to instruct the host equipment control computer to:

(a) monitor for and process status and operational data specific to each of the pieces of equipment in the second mobile mining process train, received via both the third and fourth wireless bridges positioned on the second mobile slurry facility, including control data and run status data for each piece of equipment in the second mobile mining process train;

(b) provide at least part of each set of status and operational data received in association with the second mobile mining process train for display on the user interface displayed on the display device connected to at least one of the host equipment control computer and the remote computer in communication with the host equipment control computer;

(c) provide a second network activity alert signal to the user interface if one of the third and fourth wireless networks is interrupted including if communication is lost with any wireless bridge in one of the third and fourth wireless networks for at least the predetermined time limit; and (d) provide a second equipment failure alert signal if the run status data received for any equipment in the second mobile mining process train indicates that the corresponding piece of equipment has a failure falling within the predetermined class of critical failures, wherein the equipment failure alert signal identifies the corresponding piece of equipment that has failed.

In another variation, the system 10 illustrated in connection with FIG. 1 or any of the variations thereof illustrated in connection with the other figures, can have the first and second wireless networks 36 and 38 adapted to support a mesh network. With a mesh network, communications between the host equipment control computer 29 or any one piece of mobile mining equipment and another piece of mobile mining equipment can be established either directly (where available) or indirectly via any one or more intermediate pieces of mobile mining equipment within communications range and capable of establishing an indirect communications link. For instance, in this variation, communications between the host equipment control computer and the mobile sizer 20 may be established either via the mobile slurry facility 14, directly or via the mobile mining conveyor hopper 18, the mobile mining conveyor 16 and the mobile slurry facility 14. In another example, the mobile slurry facility 14 may communicate indirectly with the other pieces of mobile mining equipment, for instance, with the mobile mining conveyor hopper 18 via the mobile mining conveyor 16. This added adaptability enables the first and second wireless networks 36 and 38 to be established and remain even more reliably available without any substantial interruption even in the presence of additional potential obstructions for direct communications or where two pieces of mobile mining equipment which are intended to communicate with each other are unable to directly communicate with each other because of the distance between them.

In yet another variation, the system 10 illustrated in connection with FIG. 1 can be adapted to interface and communicate with other networked systems.

In yet another variation, the system 10 illustrated in connection with FIG. 1 can be adapted to collect and analyze data associated with one or more maintenance networks. For instance, the system 10 can be adapted to collect and analyze data associated with one or more variable frequency drives (VFDs) used by one or more of the pieces of mobile mining equipment. For example, VFD data that can be collected by equipment data collectors and controllers positioned on corresponding pieces of mobile mining equipment include data relating to: current, torque, speed of operation, voltage, power factor, temperature and/or rectifier problems.

In yet another variation, the system 10 illustrated in connection with FIG. 1 can be adapted to operate using only the first wireless network 36, in the absence of the second wireless network 38. With a single wireless network, however, there is an increased risk of network failure, and in such an arrangement, if one node in the wireless network goes down, the system 10 is adapted to shut down all or substantially all of the operations of the plurality of mobile mining equipment in the mobile mining process train. To reduce the risk of network failures when only the first wireless network is established, it is preferable to conduct site surveys to check for signal interfering objects or equipment with much greater frequency. In order to improve network reliability when only a single wireless network is used, it can be preferable to move from an unlicensed frequency such as 802.11g, to a licensed frequency. This will provide a dedicated frequency or set of frequencies for the first wireless network in the system 10. In another variation, a satellite may be dedicated to the system 10 to avoid unexpected or uncontrollable downtime by the owner of the licensed frequency. In an alternative, hybrid arrangement, the first wireless network 36 may be supplemented by a second cable network comprising a fiber optic cable network. In the case of mobile mining equipment, the fiber optic cable is preferably embedded through trailing cable (power cable) for the plurality of mobile mining equipment, so as to protect and organize the fiber optic cable.

In yet another variation, the system 10 illustrated in connection with FIG. 1 can be adapted to support real-time remote monitoring and control of other forms of mobile equipment, such as cars, trucks, trains and other land-based vehicles. In this variation, the system comprises:

(a) a plurality of equipment data collectors and controllers each positionable on a corresponding one of a plurality of mobile equipment, each of the plurality of equipment data collectors and controllers operative to collect a set of status and operational data from the corresponding one of the plurality of mobile equipment, and operative to control at least one feature of the corresponding one of the plurality of mobile equipment;

(b) a plurality of first wireless bridges each positionable on at least one of the plurality of mobile equipment, each of the first wireless bridges operative to communicate according to a first radio frequency band, operative to transmit the first set of status and operational data for processing, and operative to receive data and instructions for controlling at least one of the plurality of equipment data collectors and controllers;

(c) a plurality of second wireless bridges each positionable on at least one of the plurality of mobile equipment, each of the second wireless bridges operative to communicate according to a second radio frequency band substantially different from the first radio frequency band, operative to transmit, concurrent with the same or substantially the same data transmitted by the plurality of first wireless bridges, the first set of status and operational data, and operative to receive, concurrent with the same data and instructions received by any of the plurality of first wireless bridges, data and instructions for controlling at least one of the plurality of equipment data collectors and controllers; and (d) a host equipment control computer, optionally positionable remote from the plurality of mobile equipment, the host equipment control computer operative to communicate with plurality of mobile equipment via at least one of the plurality of mobile equipment, and operative to control at least a set of features on the plurality of mobile equipment, the host equipment control computer comprising an equipment monitoring and control program stored on a computer-readable media, the program comprising computer-readable instructions adapted to instruct the host equipment control computer to:

(i) monitor for and process status and operational data specific to each of the plurality of mobile equipment, received via both the plurality of first wireless bridges and the plurality of second wireless bridges when positioned on the mobile equipment, including control data and run status data for each of the plurality of mobile equipment; and (ii) provide at least part of each set of status and operational data for display on a user interface displayed on a display device connected to at least one of the host equipment control computer and a remote computer in communication with the host equipment control computer.

In the immediately foregoing variation the equipment monitoring and control program can comprise computer-readable instructions adapted to instruct the host equipment control computer to perform, in connection with the mobile equipment, operations equivalent to those performed by the computer program described in connection with the mobile mining train process 50 shown in FIG. 1 or other variations thereof.

In yet another variation, the plurality of pieces of mobile equipment supported may be in the hundreds or thousands of units.

Although specific embodiments of the invention have been described and illustrated, such embodiments should not to be construed in a limiting sense. Various modifications of form, arrangement of components, steps, details and order of operations of the embodiments illustrated, as well as other embodiments of the invention, will be apparent to persons skilled in the art upon reference to this description. For instance, various aspects of the invention, including various methods, may be implemented as software, hardware or firmware. It is therefore contemplated that the appended claims will cover such modifications and embodiments as fall within the true scope of the invention. In the specification including the claims, numeric ranges are inclusive of the numbers defining the range.

What is claimed is:

1. A system for real-time remote monitoring and control of mobile mining equipment using at least two concurrently operational wireless networks, the system comprising:

(a) a first mobile mining process train comprising a first plurality of mobile mining equipment including a first mobile slurry facility operative to receive and process mined material from other equipment in the first mobile mining process train;

(b) a first plurality of equipment data collectors and controllers each positioned on a corresponding one of the first plurality of mobile mining equipment, each of the first plurality of equipment data collectors and controllers operative to collect a set of status and operational data from the corresponding one of the first plurality of mobile mining equipment, and operative to control at least one feature of the corresponding one of the first plurality of mobile mining equipment, wherein each of the first plurality of equipment data collectors and controllers are positioned in communication with:

(i) a first wireless bridge, positioned on the corresponding one of the first plurality of mobile mining equipment, operative to communicate according to a first radio frequency band, operative to transmit the first set of status and operational data for processing, and operative to receive data and instructions for controlling the corresponding equipment data collector and controller; and (ii) a second wireless bridge, positioned on the corresponding one of the first plurality of mobile mining equipment, operative to communicate according to a second radio frequency band substantially different from the first radio frequency band, operative to transmit, concurrent with the same or substantially the same data transmitted by the first wireless bridge, the first set of status and operational data for further processing, and operative to receive, concurrent with the same or substantially the same data and instructions received by the first wireless bridge, data and instructions for controlling the corresponding equipment data collector and controller;

wherein the first wireless bridges collectively form a first wireless network and the second wireless bridges collectively form a second wireless network, and wherein the data collector and controller positioned on the first mobile slurry facility is further operative to receive status and operational data concurrently over both the first wireless network and the second wireless network from each of the other data collectors and controllers positioned on the other pieces of equipment in the first mobile mining process train; and (c) a host equipment control computer operative to communicate with the first plurality of mobile mining equipment via the first mobile slurry facility, and operative to control at least a set of features on the first mobile mining process train, the host equipment control computer comprising an equipment monitoring and control program stored on a computer-readable media, the program comprising computer-readable instructions adapted to instruct the host equipment control computer to:

(i) monitor for and process status and operational data specific to each of the pieces of equipment in the first mobile mining process train, received via both the first and second wireless bridges positioned on the first mobile slurry facility, including control data and run status data for each piece of equipment in the first mobile mining process train;

(ii) provide at least part of each set of status and operational data for display on a user interface displayed on a display device connected to at least one of the host equipment control computer or a remote computer in communication with the host equipment control computer; and (iii) transmit to at least one of the first plurality of equipment data collectors and controllers, via the mobile slurry facility, data and instructions for controlling the set of features on the first mobile mining process train.

2. The system according to claim 1, wherein the equipment monitoring and control program comprises computer-readable instructions adapted to instruct the host equipment control computer to:
(i) provide a network activity alert signal to the user interface if one of the first and second wireless networks is interrupted including if communication is lost with any wireless bridge in one of the first and second wireless networks for at least a predetermined time limit; and
(ii) provide an equipment failure alert signal for further processing or for display on the user interface if the run status data received for any equipment in the first mobile mining process train indicates that the corresponding piece of equipment has a failure falling within a predetermined class of critical failures, wherein the equipment failure alert signal identifies the corresponding piece of equipment which has failed.

3. The system according to claim 2, wherein the equipment monitoring and control program comprises computer-readable instructions adapted to instruct the host equipment control computer to:
(i) initiate, in response to the equipment failure alert signal, a first type of shutdown of at least a portion of the first mobile mining process train affected by an equipment failure, wherein the first type of shutdown is adapted to occur according to a first predetermined shutdown sequence adapted to at least the portion of the first mobile mining process train affected by the equipment failure.

4. The system according to claim 2, wherein the equipment monitoring and control program comprises computer-readable instructions adapted to instruct the host equipment control computer to:
(i) monitor, according to a predetermined verification schedule, the operability of each of the first and second wireless networks by transmitting, via the first mobile slurry facility, unique device identifiers to each of the first and second wireless bridges positioned on the equipment in the first mobile mining process train and, for each unique device identifier transmitted, monitoring for receipt, via the corresponding wireless bridge positioned on the first mobile slurry facility, of a receipt confirmation signal in less than the predetermined time limit from the corresponding wireless bridge of the corresponding piece of equipment in the first mobile mining process train;
(ii) provide a network failure alert signal to the user interface if both of the first and second wireless networks are concurrently interrupted for at least the predetermined time limit; and
(iv) initiate, in response to the network failure alert signal, a second type of shutdown of at least the portion of the first mobile mining process train affected by the failure of the first and second wireless networks, wherein the second type of shutdown is adapted to occur according to a second predetermined shutdown sequence adapted at least to the portion of the first mobile mining process train affected by the failure of the first and second wireless networks.

5. The system according to claim 1, wherein the first plurality of mobile mining equipment further comprises at least one of:
(a) a mobile comminuting device operative to receive and cause a mined material to have pieces of material that do not exceed a predetermined size;
(b) a mobile mining conveyor hopper operative to receive the mined material from the mobile sizer;
(c) a mobile mining conveyor operative to receive the mined material from the mobile mining conveyor hopper and to transport the mined material for processing by the mobile slurry facility; or
(d) a mobile excavator.

6. The system according to claim 5, wherein the equipment data collector and controller positioned on the mobile slurry facility is adapted to:
(a) monitor, via both the first and second wireless networks, a set of operating conditions associated with the mobile mining conveyor; and
(b) commence a shutdown sequence for the mobile slurry facility if, as one of the first set of operating conditions, an error condition is detected in association with the mobile mining conveyor indicating at least one of:
(i) a failure in the operation of the mobile mining conveyor;
(ii) an emergency shutdown of the mobile mining conveyor;
(iii) a fire alarm associated with the mobile mining conveyor;
(iv) a communications failure with the mobile mining conveyor; or
(v) a misalignment of the mobile mining conveyor in association with the mobile slurry facility beyond a first predetermined set of alignment parameters.

7. The system according to claim 5, wherein the equipment data collector and controller positioned on the mobile slurry facility is adapted to:
(a) monitor, via both the first and second wireless networks, a set of operating conditions associated with at least one of the mobile excavator, the mobile comminuting device or a hydro-transport booster pump; and
(b) commence a shutdown sequence for the mobile slurry facility if, as one of the set of operating conditions, an error condition is detected in association with the mobile excavator or the hydro-transport booster pump, indicating at least one of:
(i) a failure in downstream pumps associated with the hydro-transport booster pump;
(ii) a communications failure with the mobile excavator;
(iii) a communications failure with the mobile comminuting device; or
(iv) a communications failure with the hydro-transport booster pump.

8. The system according to claim 5, wherein the equipment data collector and controller positioned on the mobile mining conveyor is adapted to:
(a) monitor, via both the first and second wireless networks, a set of operating conditions associated with the mobile mining conveyor hopper; and
(b) commence a shutdown sequence for the mobile mining conveyor if, as one of the set of operating conditions, an error condition is detected in association with the mobile mining conveyor hopper indicating a communications failure with the mobile mining conveyor hopper.

9. The system according to claim 5, wherein the equipment data collector and controller positioned on the mobile mining conveyor is adapted to:
(a) monitor, via both the first and second wireless networks, a set of operating conditions associated with the mobile slurry facility; and
(b) commence a shutdown sequence for the mobile mining conveyor if, as one of the set of operating conditions, an error condition is detected in association with the mobile slurry facility indicating at least one of:
(i) a failure in the operation of the mobile slurry facility;
(ii) an emergency shutdown of the mobile slurry facility;
(iii) a fire alarm associated with the mobile slurry facility; or
(iv) a communications failure with the mobile slurry facility.

10. The system according to claim 5, wherein the equipment data collector and controller positioned on the mobile comminuting device is adapted to:
(i) monitor, via both the first and second wireless networks, a set of operating conditions associated with the mobile mining conveyor hopper; and
(ii) commence a shutdown sequence for the mobile comminuting device if, as one of the set of operating conditions, an error condition is detected in association with the mobile mining conveyor hopper indicating at least one of:
(i) a failure in the operation of the mobile mining conveyor hopper;
(ii) an emergency shutdown of the mobile mining conveyor hopper;
(iii) a fire alarm associated with the mobile mining conveyor hopper; or
(iv) a communications failure with mobile mining conveyor hopper.

11. The system according to claim 5, wherein the equipment data collector and controller positioned on the mobile comminuting device is further adapted to:
(a) monitor, via both the first and second wireless networks, a set of operating conditions associated with the mobile mining conveyor; and
(b) commence a shutdown sequence for the mobile comminuting device if, as one of the set of operating conditions, an error condition is detected in association with the mobile mining conveyor indicating at least one of:
(i) a failure in the operation of the mobile mining conveyor;
(ii) an emergency shutdown of the mobile mining conveyor;
(iii) a fire alarm associated with the mobile mining conveyor; or
(iv) a communications failure with mobile mining conveyor.

12. The system according to claim 5, wherein the host equipment control computer is adapted to permit a user to control at least one piece of equipment making up the first mobile mining process train via at least one of the host equipment control computer or the remote computer, including to control at least one of the mobile slurry facility, the mobile excavator or the mobile comminuting device.

13. The system according to claim 12, wherein the remote computer is a wireless personal computing device adapted to control at least one piece of equipment making up the first mobile mining process train via instructions transmitted over the first and second wireless networks.

14. The system according to claim 1, further comprising a third wireless network for communicating, over a third radio frequency band substantially different from the first radio frequency band and the second radio frequency band, audio data or video data collected via the first plurality of equipment data collectors and controllers.

15. The system according to claim 14, wherein the audio data or video data is transmitted from the first plurality of mobile mining equipment to the host equipment control computer via the third wireless network.

16. The system according to claim 14, wherein the host equipment control computer is adapted to control, via instructions transmitted over at least one of the first, second or third wireless networks, video cameras positioned on the first plurality of mobile mining equipment.

17. The system according to claim 14, wherein the third wireless network is established using an available frequency band available on the second wireless bridges, wherein the available frequency band is the third frequency band.

18. The system according to claim 1, further comprising:
(a) a second mobile mining process train remote from the first mobile mining process train, the second mobile mining process train comprising a second plurality of mobile mining equipment including a second mobile slurry facility;
(b) a second plurality of equipment data collectors and controllers each positioned on a corresponding one of the second plurality of mobile mining equipment, each of the second plurality of equipment data collectors and controllers operative to collect a set of status and operational data from the corresponding one of the second plurality of mobile mining equipment, and operative to control at least one feature of the corresponding one of the second plurality of mobile mining equipment, wherein each of the second plurality of equipment data collectors and controllers is in communication with:
(i) a third wireless bridge, configured to communicate according to a third radio frequency band and positioned on the corresponding one of the second plurality of mobile mining equipment, operative to transmit the second set of status and operational data for processing and operative to receive data and instructions for controlling the corresponding equipment data collector and controller; and
(ii) a fourth wireless bridge, positioned on the corresponding one of the second plurality of mobile mining equipment, operative to communicate according to a fourth radio frequency band substantially different from the third radio frequency band, operative to transmit, concurrent with the same or substantially the same data transmitted by the third wireless bridge, the first set of status and operational data for central processing, and operative to receive, concurrent with the same or substantially the same data and instructions received by the third wireless bridge, data and instructions for controlling the corresponding equipment data collector and controller;
wherein the third wireless bridges collectively form a third wireless network and the fourth wireless bridges collectively form a fourth wireless network, and wherein the data collector and controller positioned on the second mobile slurry facility is further operative to receive status and operational data concurrently over both the third wireless network and the fourth wireless network from each of the other data collectors and controllers positioned on the other pieces of equipment in the second mobile mining process train; and
(c) wherein the equipment monitoring and control program further comprises computer-readable instructions adapted to instruct the host equipment control computer to:
(i) monitor for and process status and operational data specific to each of the pieces of equipment in the second mobile mining process train, received via both the third and fourth wireless bridges positioned on the second mobile slurry facility, including control data and run status data for each piece of equipment in the second mobile mining process train;

(ii) provide at least part of each set of status and operational data received in association with the second mobile mining process train for display on the user interface displayed on the display device connected to at least one of the host equipment control computer or the remote computer in communication with the host equipment control computer;

(iii) provide a network activity alert signal to the user interface if one of the third and fourth wireless networks is interrupted including if communication is lost with any wireless bridge in one of the third and fourth wireless networks for at least the predetermined time limit; and (iv) provide an equipment failure alert signal for further processing or for display on the user interface if the run status data received for any equipment in the second mobile mining process train indicates that the corresponding piece of equipment has a failure falling within the predetermined class of critical failures, wherein the equipment failure alert signal identifies the corresponding piece of equipment which has failed.

19. A method of monitoring and controlling a plurality of mobile mining equipment, the method comprising:

(a) establishing a first wireless network for monitoring and controlling the plurality of mobile mining equipment, including configuring a first set of wireless bridges comprising a plurality of first wireless bridges, each first wireless bridge positioned on one of the plurality of mobile mining equipment, to communicate according to a first radio frequency band;

(b) establishing a second wireless network for monitoring and controlling the plurality of mobile mining equipment concurrently with the first wireless network, including configuring a second set of wireless bridges comprising a plurality of second wireless bridges, each second wireless bridge positioned on one of the plurality of mobile mining equipment, to communicate according to a second radio frequency band substantially different from the first radio frequency band, wherein the second set of wireless bridges communicate substantially concurrently the same or substantially the same data transmitted by corresponding ones of the first set of wireless bridges;

(c) collecting a set of status and operational data from each of the plurality of mobile mining equipment via at least one equipment data collector and controller positioned on each of the plurality of mobile mining equipment so as to form collected sets of status and operational data;

(d) transmitting, over the first and second wireless networks, the collected sets of status and operational data from the first and second wireless bridges positioned on the plurality of mobile mining equipment to a host equipment control computer;

(e) processing, with the host equipment control computer, at least part of the collected sets of status and operational data received from the first and second wireless bridges via the first and second wireless networks;

(f) providing at least part of the collected sets of status and operational data for display on a user interface of a field operator's personal computing device operative to remotely monitor and control at least a portion of the features of the plurality of mobile mining equipment; and (g) transmitting from the host computer to the plurality of mobile mining equipment, via at least one of the plurality of mobile mining equipment, data and instructions for controlling the plurality of mobile mining equipment.

20. The method according to claim 19, further comprising:

(a) monitoring for and detecting an interruption in communication over at least one of the first or second wireless networks for at least a predetermined time limit; and (b) in response to detecting an interruption in communication over only one of the first and second wireless networks for at least the predetermined time limit, providing a network interruption alert signal to at least one of the field operator's personal computing device or the host equipment control computer.

21. The method according to claim 20, further comprising:

(a) in response to detecting an interruption in communications over both of the first and second wireless networks for at least the predetermined time limit, (i) providing a network failure alert signal to the field operator's personal computing device and the host equipment control computer; and (ii) initiating a first type of shutdown of at least the one or more pieces of equipment in the plurality of mobile mining equipment affected by the interruption in communications over both of the first and second wireless networks for at least the predetermined time limit.

22. The method according to claim 19, further comprising:

(a) monitoring for and detecting, via at least one of the equipment data collectors and controllers, a first type of equipment failure on at least one piece of equipment from among the plurality of mobile mining equipment; and (b) in response to detecting the first type of equipment failure, (i) providing an equipment failure alert signal to at least the host equipment control computer, wherein the equipment failure alert signal identifies the corresponding equipment which has failed and the particular type of failure; and (ii) initiating a type of shutdown of at least the one or more pieces of equipment in the plurality of mobile mining equipment affected by the first type of equipment failure.

23. A computer-readable medium having stored thereon instructions for directing at least one processor to execute the method of claim 19.

24. A system for real-time remote monitoring and control of mobile mining equipment, the system comprising:

(a) means for establishing a first wireless network according to a first radio frequency band for monitoring and controlling the plurality of mobile mining equipment;

(b) means for establishing a second wireless network according to a second radio frequency band substantially different from the first radio frequency band for monitoring and controlling the plurality of mobile mining equipment concurrently with the first wireless network and for communicating substantially concurrently the same or substantially the same data transmitted via the first wireless network;

(c) means for collecting a set of status and operational data from each of the plurality of mobile mining equipment to form collected sets of status and operational data;

(d) means for transmitting over the first and second wireless networks the collected sets of status and operational data to a host equipment control computer;

(e) means for processing at least part of the transmitted collected sets of status and operational data received over the first and second wireless networks;

(f) means for providing at least part of the collected sets of status and operational data for display to allow a user to remotely monitor and control at least a portion of the features of the plurality of mobile mining equipment; and (g) means for transmitting to the plurality of mobile mining equipment, data and instructions for controlling the plurality of mobile mining equipment.

25. The system according to claim 24, further comprising:

(a) means for monitoring a first set of operating conditions associated with a mobile mining conveyor, wherein the mobile mining conveyor forms part of the plurality of mobile mining equipment; and (b) means for commencing a shutdown sequence for a mobile slurry facility that forms part of the plurality of mobile mining equipment if, as one of the first set of operating conditions, an error condition is detected in association with the mobile mining conveyor indicating at least one of:
  (i) a failure in the operation of the mobile mining conveyor;
  (ii) an emergency shutdown of the mobile mining conveyor;
  (iii) a fire alarm associated with the mobile mining conveyor;
  (iv) a communications failure with the mobile mining conveyor; or
  (v) a misalignment of the mobile mining conveyor in association with the mobile slurry facility beyond a first predetermined set of alignment parameters.

26. The system according to claim 25, further comprising:

(a) means for monitoring a second set of operating conditions associated with at least one of a mobile excavator, a mobile comminuting device or a hydro-transport booster pump; and (b) means for commencing a shutdown sequence for the mobile slurry facility if, as one of the second set of operating conditions, an error condition is detected in association with the mobile excavator or the hydro-transport booster pump, indicating at least one of:
  (i) a failure in downstream pumps associated with the hydro-transport booster pump;
  (ii) a communications failure with the mobile excavator;
  (iii) a communications failure with the mobile comminuting device; or
  (iv) a communications failure with the hydro-transport booster pump.

27. The system according to claim 25, further comprising:

(a) means for monitoring a second set of operating conditions associated with a mobile mining conveyor hopper associated with the mobile mining conveyor; and (b) means for commencing a shutdown sequence for the mobile mining conveyor if, as one of the second set of operating conditions, an error condition is detected in association with the mobile mining conveyor hopper indicating a communications failure with the mobile mining conveyor hopper.

28. The system according to claim 25, further comprising:

(a) means for monitoring a second set of operating conditions associated with the mobile slurry facility; and (b) means for commencing a shutdown sequence for the mobile mining conveyor if, as one of the second set of operating conditions, an error condition is detected in association with the mobile slurry facility indicating at least one of:
  (i) a failure in the operation of the mobile slurry facility;
  (ii) an emergency shutdown of the mobile slurry facility;
  (iii) a fire alarm associated with the mobile slurry facility; or
  (iv) a communications failure with the mobile slurry facility.

29. The system according to claim 25, further comprising:

(a) means for monitoring a second set of operating conditions associated with a mobile mining conveyor hopper associated with the mobile mining conveyor; and (b) means for commencing a shutdown sequence for the mobile comminuting device if, as one of the second set of operating conditions, an error condition is detected in association with the mobile mining conveyor hopper indicating at least one of:
  (i) a failure in the operation of the mobile mining conveyor hopper;
  (ii) an emergency shutdown of the mobile mining conveyor hopper;
  (iii) a fire alarm associated with the mobile mining conveyor hopper; or
  (iv) a communications failure with the mobile mining conveyor hopper.

30. The system according to claim 25, further comprising:

(a) means for monitoring a second set of operating conditions associated with the mobile mining conveyor; and (b) means for commencing a shutdown sequence for the mobile comminuting device if, as one of the second set of operating conditions, an error condition is detected in association with the mobile mining conveyor indicating at least one of:
  (i) a failure in the operation of the mobile mining conveyor;
  (ii) an emergency shutdown of the mobile mining conveyor;
  (iii) a fire alarm associated with the mobile mining conveyor; or
  (iv) a communications failure with the mobile mining conveyor.

31. A system for real-time remote monitoring and control of mobile equipment, the system comprising:

(a) a plurality of equipment data collectors and controllers each positionable on a corresponding one of a plurality of mobile equipment, each of the plurality of equipment data collectors and controllers operative to collect a set of status and operational data from the corresponding one of the plurality of mobile equipment, and operative to control at least one feature of the corresponding one of the plurality of mobile equipment;

(b) a plurality of first wireless bridges each positionable on at least one of the plurality of mobile equipment, each of the first wireless bridges operative to communicate according to a first radio frequency band, operative to transmit the first set of status and operational data for processing, and operative to receive data and instructions for controlling at least one of the plurality of equipment data collectors and controllers;

(c) a plurality of second wireless bridges each positionable on at least one of the plurality of mobile equipment, each of the second wireless bridges operative to communicate according to a second radio frequency band substantially different from the first radio frequency band, operative to transmit, concurrent with the same or substantially the same data transmitted by the plurality of first wireless bridges, the first set of status and operational data, and operative to receive, concurrent with the same or substantially the same data and instructions received by any of the plurality of first wireless bridges, data and instructions for controlling at least one of the plurality of equipment data collectors and controllers; and (d) a host equipment control computer operative to communicate with the plurality of mobile equipment via a first one of the plurality of mobile equipment, and operative to control at least a set of features on the plurality of mobile equipment, the host equipment control computer comprising an equipment monitoring and control program stored on a computer-readable media, the program comprising computer-readable instructions adapted to instruct the host equipment control computer to:

(i) monitor for and process status and operational data specific to each of the plurality of mobile equipment, received via both the plurality of first wireless bridges and the plurality of second wireless bridges when positioned on the mobile equipment, including control data and run status data for each of the plurality of mobile equipment;

(ii) provide at least part of each set of status and operational data for display on a user interface displayed on a display device connected to at least one of the host equipment control computer or a remote computer in communication with the host equipment control computer; and (iii) transmit to at least one of the plurality of equipment data collectors and controllers, via the first one of the plurality of mobile equipment, data and instructions for controlling the set of features on the plurality of mobile equipment.

32. The system according to claim 31, wherein the equipment monitoring and control program comprises computer-readable instructions adapted to instruct the host equipment control computer to:

(i) provide a network activity alert signal to the user interface if at least one of the plurality of first wireless bridges and the plurality of second wireless bridges is interrupted, including if communication is lost for at least the predetermined time limit; and (ii) provide an equipment failure alert signal for further processing or for display on the user interface if the run status data received in association with any of the plurality of mobile equipment indicates that the corresponding piece of mobile equipment has a failure falling within a predetermined class of critical failures, wherein the equipment failure alert signal identifies the corresponding piece of mobile equipment which has failed.

33. The system according to claim 32, wherein the equipment monitoring and control program comprises computer-readable instructions adapted to instruct the host equipment control computer to initiate, in response to the equipment failure alert signal, a first type of shutdown of at least the portion of the plurality of mobile equipment affected by the equipment failure, wherein the first type of shutdown is adapted to occur according to a first predetermined shutdown sequence adapted to the portion of the plurality of mobile equipment identified by the equipment failure alert signal as having the equipment failure.

34. The system according to claim 33, wherein the equipment monitoring and control program comprises computer-readable instructions adapted to instruct the host equipment control computer to:

(i) monitor, according to a predetermined verification schedule, the operability of each of the plurality of first wireless bridges and each of the plurality of second wireless bridges by transmitting unique device identifiers to each of the plurality of first wireless bridges and each of the plurality of second wireless bridges and, for each unique device identifier transmitted, monitoring for receipt of a receipt confirmation signal in less than the predetermined time limit from the corresponding wireless bridge of the corresponding piece of mobile equipment;

(ii) provide a network failure alert signal to the user interface if at least one connection of the plurality of first wireless bridges and at least one connection of the plurality of second wireless bridges are concurrently interrupted for at least the predetermined time limit, wherein the network failure alert signal identifies which wireless bridges have had their communication interrupted; and (iii) initiate, in response to the network failure alert signal, a second type of shutdown of at least the portion of the plurality of mobile equipment affected by the wireless bridges that have had their communication interrupted, wherein the second type of shutdown is adapted to occur according to a second predetermined shutdown sequence adapted for at least to the portion of the plurality of mobile equipment affected by the wireless bridges that have had their communication interrupted.

35. The system according to claim 3 wherein the computer-readable instructions adapted to instruct the host equipment control computer to initiate the first type of shutdown comprise computer-readable instructions adapted to instruct the host equipment control computer to transmit instructions to at least one of the first plurality of equipment data collectors and controllers via the mobile slurry facility to cause the shutdown of the at least the portion of the first mobile mining process train affected by the equipment failure.

36. The system according to claim 4 wherein the computer-readable instructions adapted to instruct the host equipment control computer to initiate the second type of shutdown comprise computer-readable instructions adapted to instruct the host equipment control computer to transmit instructions to at least one of the first plurality of equipment data collectors and controllers via the mobile slurry facility to cause the second predetermined shutdown sequence.

37. The system according to claim 33 wherein the computer-readable instructions adapted to instruct the host equipment control computer to initiate the first type of shutdown comprise computer-readable instructions adapted to instruct the host equipment control computer to transmit instructions to at least one of the first plurality of equipment data collectors and controllers via the first one of the plurality of mobile equipment to cause the shutdown of the at least the portion of the plurality of mobile equipment affected by the equipment failure.

38. The system according to claim 34 wherein the computer-readable instructions adapted to instruct the host equipment control computer to initiate the second type of shutdown comprise computer-readable instructions adapted to instruct the host equipment control computer to transmit instructions to at least one of the first plurality of equipment data collectors and controllers via the first one of the plurality of mobile equipment to cause the second predetermined shutdown sequence.

* * * * *

UNITED STATES PATENT AND TRADEMARK OFFICE
CERTIFICATE OF CORRECTION

PATENT NO.       : 8,626,376 B2
APPLICATION NO.  : 12/864350
DATED            : January 7, 2014
INVENTOR(S)      : Derrick Trottier et al.

Page 1 of 1

It is certified that error appears in the above-identified patent and that said Letters Patent is hereby corrected as shown below:

In the Claims

In Column 20, Line 16, In Claim 6, change "the first" to --the--.

Signed and Sealed this
Thirtieth Day of September, 2014

Michelle K. Lee
*Deputy Director of the United States Patent and Trademark Office*